US012772323B2

(12) United States Patent
Li et al.

(10) Patent No.: US 12,772,323 B2
(45) Date of Patent: Oct. 20, 2026

(54) USER EQUIPMENT, SCHEDULING NODE, METHOD FOR USER EQUIPMENT, AND METHOD FOR SCHEDULING NODE

(71) Applicant: Panasonic Intellectual Property Corporation of America, Torrance, CA (US)

(72) Inventors: Hongchao Li, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 316 days.

(21) Appl. No.: 18/560,075

(22) PCT Filed: Jul. 7, 2021

(86) PCT No.: PCT/EP2021/068895
§ 371 (c)(1),
(2) Date: Nov. 9, 2023

(87) PCT Pub. No.: WO2022/237996
PCT Pub. Date: Nov. 17, 2022

(65) Prior Publication Data
US 2024/0244701 A1 Jul. 18, 2024

(30) Foreign Application Priority Data
May 11, 2021 (EP) .................................... 21173426

(51) Int. Cl.
*H04W 76/20* (2018.01)
*H04L 5/00* (2006.01)
(Continued)

(52) U.S. Cl.
CPC ........... *H04W 76/20* (2018.02); *H04L 5/0051* (2013.01); *H04W 68/02* (2013.01); *H04W 72/1273* (2013.01)

(58) Field of Classification Search
CPC ... H04L 27/261; H04L 5/0096; H04L 5/0078; H04L 27/2613; H04L 27/2662; H04L 2025/03783; H04L 5/0082
See application file for complete search history.

(56) References Cited

U.S. PATENT DOCUMENTS

| | | | | |
|---|---|---|---|---|
| 2021/0288773 | A1* | 9/2021 | Lin | H04L 5/0048 |
| 2021/0378000 | A1 | 12/2021 | Zhang et al. | |

(Continued)

FOREIGN PATENT DOCUMENTS

| | | | |
|---|---|---|---|
| CN | 111585724 | A | 8/2020 |
| WO | WO 2020143722 | A1 | 7/2020 |
| WO | WO 2020164504 | A1 | 8/2020 |

OTHER PUBLICATIONS

3GPP, "3rd Generation Partnership Project; Technical Specification Group Radio Access Network; NR; Multiplexing and channel coding (Release 15)," 3GPP TS 38.212 V15.6.0, Jun. 2019. (101 pages).

(Continued)

*Primary Examiner* — Romani Ohri
(74) *Attorney, Agent, or Firm* — Seed Intellectual Property Law Group LLP

(57) ABSTRACT

The disclosure relates to a communication device, a base station and respective methods for a communication device and a base station. The base station transmits and the communication device receives an on-off indication, when the communication device is in an inactive state or in an idle state. The on-off indication indicates an availability state of a synchronization signal block (SSB) beam. The communication device then determines the availability state of the (Continued)

SSB beam and a starting time as of which the communication device is expected to use the SSB beam if the (indicated) availability state corresponds to an on-state of the SSB beam, and not use the SSB beam if the (indicated) availability state corresponds to an off-state of the SSB beam.

17 Claims, 5 Drawing Sheets

(51) Int. Cl.
*H04W 68/02* (2009.01)
*H04W 72/1273* (2023.01)

(56) References Cited

U.S. PATENT DOCUMENTS

| | | | | |
|---|---|---|---|---|
| 2021/0400703 | A1* | 12/2021 | Baldemair | H04L 5/0055 |
| 2022/0303089 | A1* | 9/2022 | Liao | H04L 5/0091 |
| 2023/0379876 | A1* | 11/2023 | Liu | H04L 5/0096 |
| 2023/0422211 | A1* | 12/2023 | Esswie | H04W 72/232 |
| 2024/0163052 | A1* | 5/2024 | Li | H04L 5/0051 |
| 2025/0158862 | A1* | 5/2025 | Li | H04L 5/0094 |

OTHER PUBLICATIONS

3GPP, "3rd Generation Partnership Project; Technical Specification Group Radio Access Network; NR; NR and NG-RAN Overall Description; Stage 2 (Release 16)," 3GPP TS 38.300 V16.5.0, Mar. 2021. (151 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 16)," 3GPP TS 38.211 V16.2.0, Jun. 2020. (131 pages).

3GPP, "3rd Generation Partnership Project; Technical Specification Group Radio Access Network; NR; Physical layer procedures for control (Release 16)," 3GPP TS 38.213 V16.5.0, Mar. 2021. (183 pages).

3GPP, "3rd Generation Partnership Project; Technical Specification Group Radio Access Network; NR; Physical layer procedures for data (Release 15)," 3GPP TS 38.214 V15.3.0, Sep. 2018. (96 pages).

3GPP, "3rd Generation Partnership Project; Technical Specification Group Radio Access Network; NR; Requirements for support of radio resource management (Release 17)," 3GPP TS 38.133 V17.1.0, Mar. 2021. (416 pages).

3GPP, "3rd Generation Partnership Project; Technical Specification Group Radio Access Network; NR; User Equipment (UE) procedures in Idle mode and RRC Inactive state (Release 16)," 3GPP TS 38.304 V16.4.0, Mar. 2021. (39 pages).

3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

Extended European Search Report, dated Nov. 3, 2021, for European Patent Application No. 21173426.4-1213. (6 pages).

International Search Report, mailed Feb. 2, 2022, for International Patent Application No. PCT/EP2021/068895. (2 pages).

ITU, "IMT Vision—Framework and overall objectives of the future development of IMT for 2020 and beyond," Recommendation ITU-R M.2083-0, Sep. 2015. (21 pages).

Vivo, "TRS/CSI-RS occasion(s) for idle/inactive UEs," R1-2102533, Agenda Item: 8.7.1.2, 3GPP TSG RAN WG1 #104b-e, e-Meeting, Apr. 12-20, 2021. (8 pages).

* cited by examiner

USER EQUIPMENT, SCHEDULING NODE, METHOD FOR USER EQUIPMENT, AND METHOD FOR SCHEDULING NODE

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitate efficient operation of the communication system as well as particular devices pertaining to the system.

BRIEF SUMMARY

One non-limiting and exemplary embodiment facilitates efficient access of idle/inactive state terminals to reference signals and/or synchronization signal block (SSB) beams.

In an embodiment, the techniques disclosed here feature an apparatus (e.g., a user equipment, UE). The apparatus comprises a transceiver that, in operation, when the UE is in an inactive state or in an idle state, receives a signalling from a scheduling device. The apparatus further comprises circuitry which, in operation, obtains from the signalling an on-off indication indicating an availability state of a synchronization signal block, SSB, beam. The circuitry determines the availability state of the SSB beam and a starting time as of which the UE is expected to (i) use the SSB beam if the availability state corresponds to an on-state of the SSB beam, and to (ii) not use the SSB beam if the availability state corresponds to an off-state of the SSB beam.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
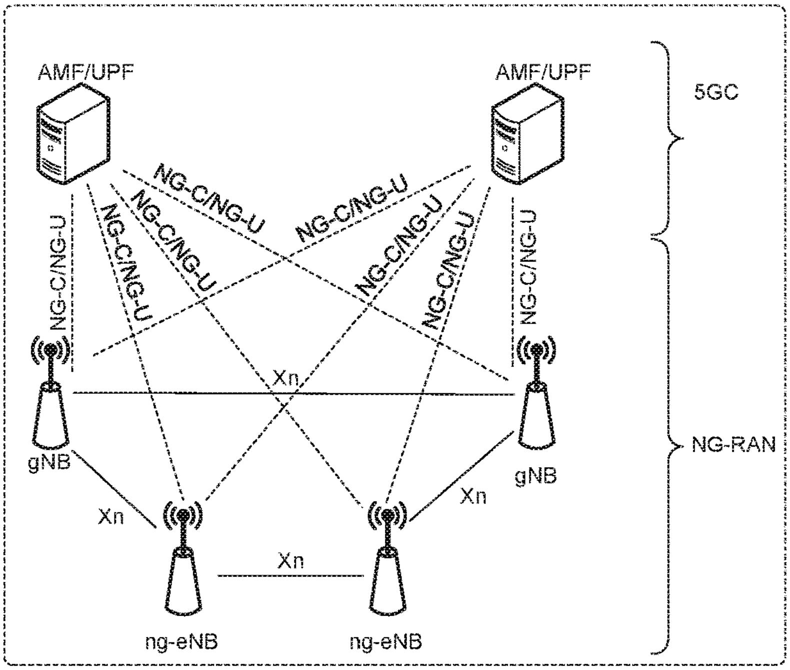
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v16.5.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP. RLC and MAC sublayers are listed respectively in sections 6.4, 6.3, and 6.2 of TS 38.300. The functions of the RRC layer are listed in subclause 7 of TS 38.300.

For instance, the Medium-Access-Control layer handles logical-channel multiplexing, and scheduling and scheduling-related functions, including handling of different numerologies.

The physical layer (PHY) is for example responsible for coding. PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.2.0, e.g., section 4). For instance, downlink and uplink transmissions are organized into frames with 10 ms duration, each frame consisting of ten subframes of respectively 1 ms duration. In 5 g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

Comparing to LTE numerology (subcarrier spacing and symbol length), NR supports multiple different types of subcarrier spacing, labeled by a parameter μ (in LTE there is only a 15 kHz subcarrier spacing, corresponding to μ=0 in NR). The types NR numerology is summarized in 3GPP TS 38.211, v 15.6.0.

5G NR Functional Split Between NG-RAN and 5GC

Figure 2:
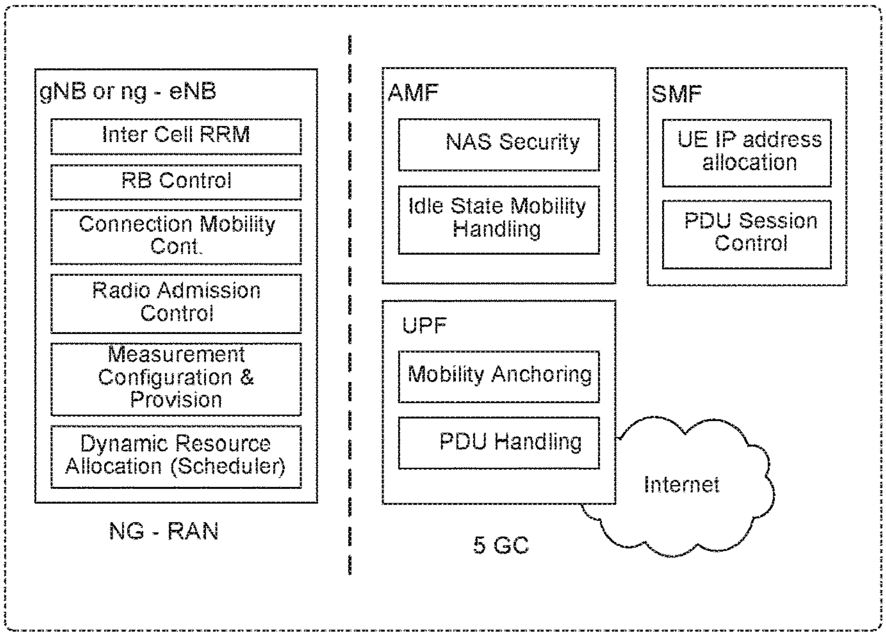
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF. UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signalling termination;
- NAS signalling security;
- Access Stratum, AS, Security control;
- Inter Core Network, CN, node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support muting traffic flows to a data network;

Branching point to support multi-homed PDU session;

QoS handling for user plane, e.g., packet filtering, gating, UIUDL rate enforcement;

Uplink Traffic verification (SDF to QoS flow mapping);

Downlink packet buffering and downlink data notification triggering.

Finally, the Session Management function. SMF, hosts the following main functions:

Session Management;

UE IP address allocation and management;

Selection and control of UP function;

Configures traffic steering at User Plane Function, UPF, to mute traffic to proper destination;

Control part of policy enforcement and QoS;

Downlink Data Notification.

RRC Connection Setup and Reconfiguration Procedures

Figure 3:
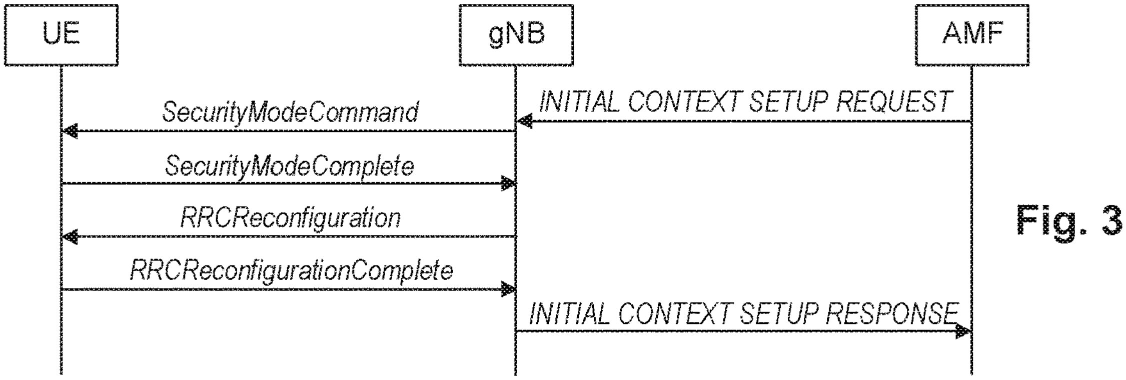
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v16.5.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

The operation of the RRC is guided by a state machine which defines certain specific states that a UE may be present in. The different RRC states in this state machine have different amounts of radio resources associated with them and these are the resources that the UE may use when it is present in a given specific state. Apart from RRC connected and RRC IDLE state, 5G NR has introduced a new RRC state names as RRC Inactive state. When UE is power up it is in Disconnected mode/Idle mode, it can move to RRC connected with initial attach or with connection establishment. If there is no activity from UE for a short time, it can suspend its session by moving to RRC Inactive and can resume its session moving to RRC connected mode. A UE can move to RRC Idle mode from RRC connected or RRC Inactive state. In connected state, the UE has both a signaling (control plane) and data (user plane) connection to the network. On the other hand, there is no data connection in the idle state and inactive state. Thus, in the idle and inactive states, the UE receives system information, synchronization, and paging. If a UE wants to send data, it has to use RACH procedure.

Usage Scenarios of IMT for 2020 and Beyond

Figure 4:
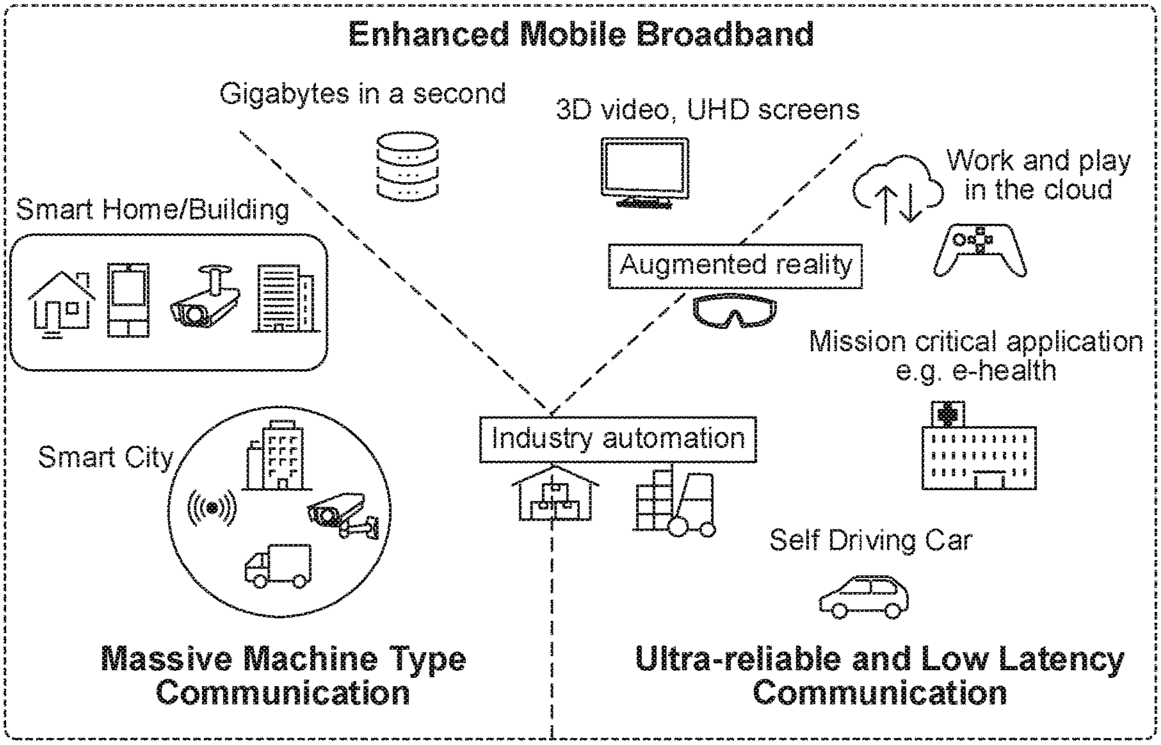
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see. e.g., ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so). e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
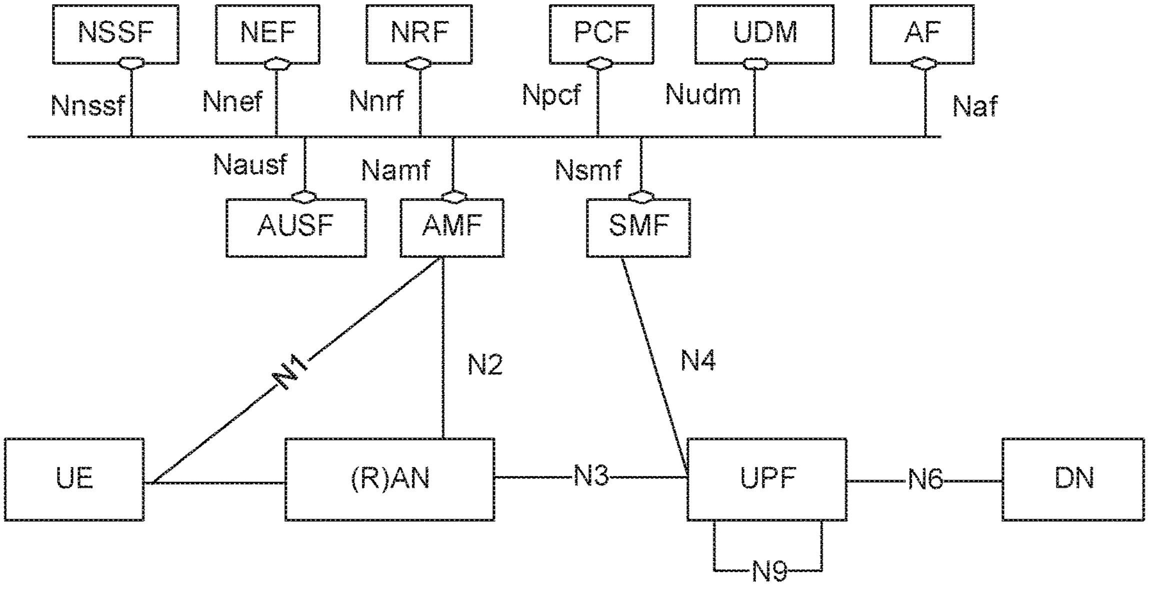
FIG. 5 is a block diagram showing an exemplary 5G system architecture for a non-roaming.

FIG. 5 illustrates a 5G NR non-roaming reference architecture (see TS 23.501 v16.1.0, section 4.23). An Application Function (AF). e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN). e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF. PCF, UPF, etc) of the 5GC to establish a PDU session including a radio bearer between a gNodeB and a UE in accordance with the QoS requirement and control circuitry, which, in operation, performs the services using the established PDU session.

Control Signals

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

Terminal

A *terminal* or *user terminal* or *user device* or *mobile station* or *mobile node* is referred to in the LTE and NR as a *user equipment (UE)*. This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay. For instance, a terminal is a physical entity (physical node) within a communication network. Still further, the communication device may be any machine-type communication device, such as IoT device or the like. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Base Station

In the present disclosure, the base *base station* may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well. A base station may be a *scheduling node* or *network node*, e.g., forming a part of the network for providing services to terminals. In particular, a base station may provide wireless access to terminals. Communication between the terminal and the base station is typically standardized and may be defined by different layers, such as PHY, MAC, RRC, etc. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB. The term base station or radio base station here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Uplink/Downlink/Sidelink

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

Data Channels/Control Channels

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

Reference Signals

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

Synchronization

In NR downlink synchronization, a UE detects the radio boundary (i.e., the timing when a radio frame starts) and OFDM symbol boundary (i.e., the timing when an OFDM symbol starts). This is performed by detecting and analyzing Synchronization Signal Block (SSB). The components of an SSB include synchronization signal, namely a Primary Synchronization Signal (PSS) and a Secondary Synchronization Signal (SSS). Moreover, an SSB includes the PBCH which further includes PBCH DMRS and PBCH (Data). The SSB carries also further data. The NR SSB is transmitted in various different patterns, depending on numerology and some other parameters. The pattern is signaled within system information.

In NR, the TRS may be provided as a dedicated RS to a UE or as a common RS for a plurality of UEs in connected mode. Based on the TRS, the UE(s) may be able to perform a finer adjustments of the synchronization, without necessity to always receive the synchronization signal.

In some systems such as NR (e.g., Rel. 15/16), a TRS/CSI resource is configured for a UE to be utilized in measurements. e.g., for channel state estimation, time tracking, frequency tracking, and/or beam tracking, by the UE in RRC_CONNECTED mode. For UEs in other modes. RRC_IDLE and RRC_INACTIVE, such measurements may rely on the SSB. For Rel.17 NR, TRS/CSI-RS may also be used by some INACTIVE/IDLE UEs for time and frequency tracking, who supports this feature of additional TRS/CSI-RS occasions informed to these UEs. Thus, in general, TRS/CSI and SSB are signals that may be used by a UE, in any RRC state, for channel state estimation, time tracking (e.g., time synchronization), frequency tracking, and/or beam tracking.

Paging

Paging is a way in which a network may provide signalization to UEs in idle and inactive state. Paging has several functions: it may trigger an RRC Setup. e.g., if there is an incoming call for a UE. Moreover, it may notify UE that there was a System Information modification.

UE has to monitor whether the networking is sending any paging message to it, which costs some energy/battery power. In particular, during the idle mode (or inactive mode), a UE gets into and stay in sleeping mode defined in DRX cycle (Discontinuous Receive Cycle). The UE periodically wakes up and monitors PDCCH in order to check for the presence of a paging message. This is performed by means of a paging temporary identifier, P-RNTI. If the PDCCH indicates that a paging message is transmitted in the subframe, then the UE needs to demodulate the PCH to see if the paging message is directed to it.

A Paging Occasion (PO) is a subframe where there may be the P-RNTI transmitted on PDCCH addressing the paging message. A Paging Frame (PF) is one Radio Frame, which may contain one or multiple Paging Occasion(s). The paging cycle is defined in the system information and specifies the location of paging frames and paging occasions within the paging frames in the time resources of the network (base station). In particular, as described. e.g., in 3GPP TS 38.304 (16.4.0, available at www.3gpp.org), Sec 7.1, (More details are also in this section), a PO may be a set of PDCCH monitoring occasions and can consist of multiple time slots (e.g., subframe or OFDM symbol) where paging DCI can be sent (3GPP TS 38.213). Furthermore, one Paging Frame (PF) is one Radio Frame and may contain one or multiple PO(s) or starting point of a PO. Paging occasions are thus resources in which a paging PDCCH may be present to schedule paging message for one or multiple UEs, but does not have to be present. Paging occasions which are actually used for paging PDCCH transmission scheduling paging message, for a certain UE, are referred to as positive POs whereas paging occasions which do not carry the paging PDCCH scheduling paging message, for a certain UE, are referred to as negative POs.

Time Intervals

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

Frequency Bands

The present disclosure may be applied to any of a licensed band and an unlicensed band.

Communication

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

Antenna Ports

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Downlink Control Channel Monitoring, PDCCH, DCI

Many of the functions operated by the UE involve the monitoring of a downlink control channel (e.g., the PDCCH, see 3GPP TS 38.300 v16.5.0, section 5.2.3) to receive, e.g., particular control information or data destined to the UE.

A non-exhaustive list of these functions is given in the following:

- a paging message monitoring function,
- a system information acquisition function,
- signalling monitoring operation for a Discontinued Reception, DRX, function,
- inactivity monitoring operation for a Discontinued Reception, DRX, function.
- random access response reception for a random access function,
- reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Physical Resource Block

In general, the term "physical resource block" (PRB) refers to the smallest allocable resource unit usable for (user) data transmission. In LTE and NR, a PRB has a predetermined number (e.g., 12) of consecutive subcarriers in frequency domain and a predetermined number of symbols in time domain (e.g., 14 OFDM symbols in LTE).

Terminology

In the following. UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

Communication System, Base Station and UE Embodiment

The present disclosure provides techniques for efficient signalling of a switch in the availability of a reference signal (RS) and/or in the availability of a synchronization signal block (SSB) beam. In the following, the efficient signalling is explicitly described for the case of a reference signal. However, it should be noted that, all that is said for the RS case holds in an analogous manner for the case of an SSB beam and vice versa, unless explicitly indicated otherwise. In other words, embodiments for the SSB beam may be obtained by replacing the term “reference signal” by the term “SSB beam”.

Here it should be noted that the term “*SSB beam*” refers to a transmission of an SSB in a particular (spatial) direction. Each SSB beam may also have/indicate a beam index (also known as SSB index) that can be used to distinguish said SSB beam from other SSB beams, transmitted in other direction than said SSB beam. A UE may then determine, based on the received signal of the SSB beam, the SSB index of the received SSB beam and determine the direction in which it was transmitted by the base station.

Figure 6:
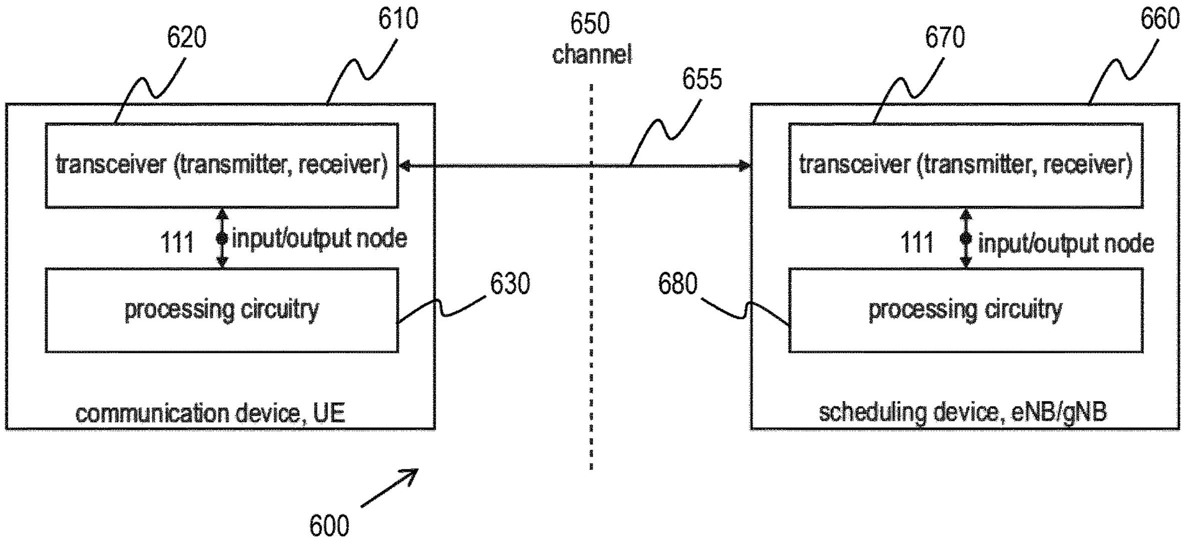
FIG. 6 is a block diagram of a communication system including a user equipment and a base station with their respective structure.

Furthermore, it is noted that an SSB burst could comprise multiple transmitted SSBs, each of which is with a beam index and/or transmitted in a particular spatial direction. Each of these multiple SSBs of the SSB burst may then be an SSB beam. In other words, an SSB burst may comprise a plurality of SSB beams. The individual SSB beams of an SSB burst may for instance be transmitted by a scheduling device successively, at different times, during the transmission time (e.g., 5 ms) of the SSB burst. Since the present disclosure relates to the transmission of reference signals and the time of theirs presence/absence, both entities, a scheduled device (typically communication device/transceiver device) and scheduling device (typically network node) take part. Accordingly, the present disclosure provides a base station and a user equipment. As illustrated in FIG. 6, user equipment 610 and base station 660 may communicate with each other over a wireless channel in a wireless communication system. For instance, the user equipment may be a NR user equipment, and the base station may be a network node or scheduling node such as a NR gNB, in particular a gNB in a Non-Terrestrial Network (NTN) NR system.

The present disclosure further provides a system including a scheduled and scheduling device, as well as a corresponding methods and programs. An example of such communication system is illustrated in FIG. 6. The communication system 600 may be a wireless communication system in accordance with the technical specifications of 5G, in particular a NR communication system. However, the present disclosure is not limited to 3GPP NR and may also be applied to other wireless or cellular systems such as NTNs.

FIG. 6 illustrates a general, simplified and exemplary block diagram of a user equipment 610 (also termed communication device) and a scheduling device 660 which is here exemplarily assumed to be located in the base station (network node), e.g., the eNB or gNB. However, in general, a scheduling device may also be a terminal in case of a sidelink connection between two terminals. Moreover, in particular with respect to the use cases of URLLC; eMBB, and mMTC, the communication device 610 may also be a sensor device, a wearable device, or a connected vehicle, or a controller of an automated machine in an industrial factory. Further, a communication device 610 may be able to function as a relay between base station 660 and another communication device (e.g., the disclosure is not limited to communication “terminals” or user “terminals”).

The UE and eNB/gNB are communicating with each other over a (wireless) physical channel 650 respectively using their transceivers 620 (UE side) and 670 (base station side). Together, the base station 660 and the terminal 610 form the communication system 600. The communication system 600 may further include other entities such as those shown in FIG. 1.

As shown in FIG. 6, in some embodiments, the user equipment (UE) 610 comprises a transceiver 620 which, in operation, receives, when the UE is in the inactive state or in the idle state a signalling from a scheduling device. The UE further comprises a circuitry 630 which, in operation, obtains from the signalling an availability indication indicating an availability state of a reference signal (RS). The circuitry 630 determines the availability state of the RS and a starting time as of which the UE is expected to use the RS if the (indicated) availability state corresponds to an available state of the RS, and not use the RS if the (indicated) availability state corresponds to an unavailable state of the RS. For instance, the UE (e.g., circuitry 630) may determine the availability state of the RS and/or the starting time based on the availability indication and/or based on the availability signalling.

Figure 7A:
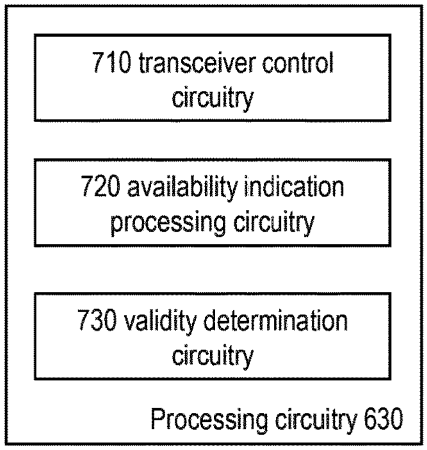
FIG. 7A is a block diagram illustrating functional structure of the processing circuitry at the user equipment side.

FIG. 7A shows a functional structure of the circuitry 630. In particular, it includes a transceiver control circuitry 710. The transceiver control circuitry 710, in operation, controls the transceiver. For example, the control may include controlling the transceiver 620 to decode (monitor) the PEI and/or the POs and/or system information or the like; or to receive (detect) reference signal. For example, the transceiver control circuitry 710 controls the transceiver 620 to decode the availability indication. The circuitry 630 may include availability indication processing circuitry 720, which determines the value of the availability indication received by the transceiver 620. Depending on the value of the availability indication, validity determination circuitry 730 determines the starting time as of which the communication device 610 assumes the reference signal (availability or non-availability of which was indicated by the availability indication) is available or no longer available as will be described below in more details in several exemplary embodiments.

It is noted that the circuitry may be a general processing circuitry including one or more processors which may execute code instructions stored in a memory (which may be also part of the circuitry) and which may include portions of the code instructions corresponding to the functionality described above with reference to respective circuitry 710-730. However, the present disclosure is not limited to any particular circuitry and embodiments of the disclosure may include dedicated or programmable hardware or general purpose hardware or any combination thereof.

In general, the signalling including the availability indication or *availability signalling* may be a L1 signalling. In particular, the availability signalling may include or be a PEI or a paging DCI. The availability signalling includes an *availability indication*, which is generated by the scheduling device and may be obtained by the UE. The availability indication indicates a (future) state of one or more reference signals (RSs) rather than the present availability state of the RS. If there are more than RS, the availability indication may indicate a state for each of said RSs or one state for all or a group of RSs. In particular, an availability indication may indicate different states for the RSs.

In general, there may be two availability states of an RS, which are here denoted as "available" and "unavailable". Here, "available" may mean that the RS is transmitted (e.g., periodically) by the base station and that the UE is expected use the RS, whereas "unavailable" may mean that the UE is not expected to use the RS. Here it should be noted that, when the UE is expected to use the RS, the RS is/should in general also be transmitted by the base station; and when the base station is not transmitting the RS, the UE is/should in general also be expected to not use the RS. However, when the base station is transmitting the RS, the UE may or may not be expected to use the RS; and when the RS is expected to not use the RS, the base station may actually be transmitting the RS. Furthermore, it should be noted that the availability state indicated by the availability indication can, but must not, correspond to the current availability state of the RS or the currently expected behavior of the UE. As further explained below, the indicated availability state in general indicates an availability state of the RS that applies from an availability indication starting time, which may in general be after the reception time of the availability indication.

The reference signal (RS) or RSs of which the availability indication indicates availability or unavailability may be traffic reference signal(s) (TRS), which may also be used as a CSI-RS. It is noted that the terms RS and RS configuration are used interchangeably. That is, an RS (configuration) may correspond to a plurality of *RS occasions*, where the term RS occasion refers to individual transmissions of the reference signal. In other words, an RS occasion may correspond to specific time/frequency resource(s) in which a transmission of the RS takes place (e.g., takes place according to a specific pattern defined by the RS configuration). Here, it should be noted that the different or the same signals may be transmitted at the individual RS occasion of a given RS.

As also shown in FIG. 6, in some embodiments, the base station 660 (or scheduling device 660) comprises a circuitry 680. The circuitry 680, in operation, determines that a UE, which is in an inactive state or in an idle state, is to be informed of the availability state of an RS. At this, the circuitry may in general determine that one or more inactive/idle UE(s) are to be informed and/or may determine which UE(s) are to be informed. Furthermore, the circuitry 680, in operation, determines a starting time that is to be indicated to the UE, wherein the starting time is a time as of which the UE is expected to i) use the RS if the availability state corresponds to an available state of the RS, and to ii) not use the RS if the availability state corresponds to an unavailable state of the RS. Furthermore, the circuitry 680, in operation, generates a signalling that i) indicates the starting time, and ii) includes an availability indication indicating the availability state of the RS. Here the indication of the starting time may be explicit or implicit (e.g., just based on the time of reception of said signalling) as further explained below. The base station 660 further comprises a transceiver 670 which, in operation, transmits the generated signalling. The base station (e.g., the transceiver 670) may also transmit the RS in accordance with the availability indication(s) transmitted to UE(s). That is, when there is at least one UE that is expected to use a particular RS (configuration), the base station should and/or will also transmit said RS.

Figure 7B:
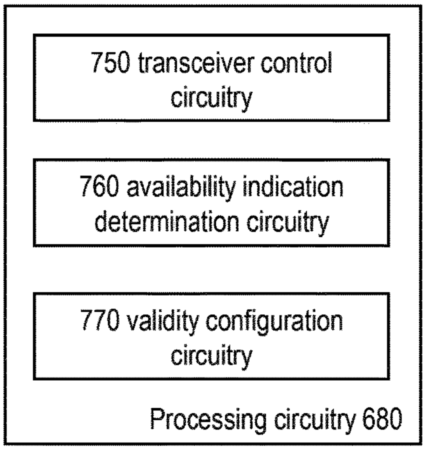
FIG. 7B is a block diagram illustrating functional structure of the processing circuitry at the base station side.

FIG. 7B shows a functional structure of the circuitry 680. In particular, it includes a transceiver control circuitry 750. The transceiver control circuitry 750, in operation, controls the transceiver. For example, the control may include controlling the transceiver 670 to transmit the PEI and/or the POs and/or system information or the like; or to transmit reference signal. For example, the transceiver control circuitry 710 controls the transceiver 670 to transmit the availability indication. The circuitry 680 may include availability indication determination circuitry 760, which determines that a user equipment, UE (one or more UEs), which is in an inactive state or in an idle state, is to be provided with an indication of the availability state of a RS and determines whether the availability of the RS should indicate availability or unavailability. Moreover, the circuitry 680 includes a validity configuration circuitry 770, which provides a UE with an indication of validity of the availability indication. In this way, the BS may configure the UE. The validity configuration circuitry 770 determines a starting time that is to be indicated to the UE, wherein the starting time is a time as of which the UE is expected to: use the RS if the availability state corresponds to an available state of the RS, and not use the RS if the availability state corresponds to an unavailable state of the RS. The transceiver control circuitry 750 then controls the transceiver to transmit a signalling that indicates the starting time.

Figure 12:
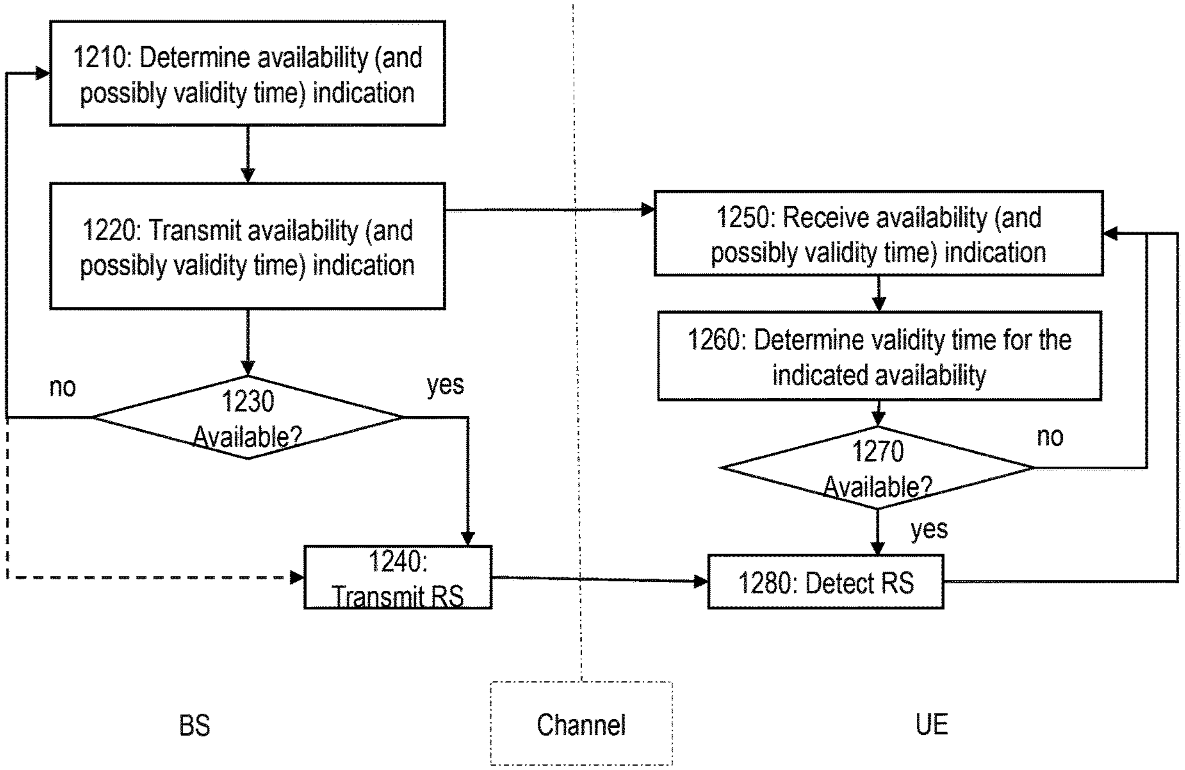
FIG. 12 is a flow diagram illustrating an exemplary method for determining availability and validity of reference signals.

In correspondence with the above described UE, a method to be performed by/for a UE is provided. As illustrated in FIG. 12, the method includes the steps of: receiving 1250, when the UE is in an inactive state or in an idle state, a signalling from a scheduling device; obtaining, from the signalling, an availability indication indicating an availability state of a reference signal (RS); and determining 1260 i) the availability state of the RS, and ii) a starting time as of which the UE is expected to a) use the RS if the availability state corresponds to an available state of the RS, and to b) not use the RS if the availability state corresponds to an unavailable state of the RS. The UE station (e.g., the transceiver 620) may also detect 1280 the RS in accordance with the received availability indication. That is, when the availability indication indicates that the RS is available (yes in 1270), the UE may also start detecting 1280 the RS as of the validity starting time that the UE determined 1260 for the availability indication.

Furthermore, in correspondence with the above described base station, a method to be performed by/for a scheduling device is provided. As illustrated in FIG. 12, the method includes the steps of: determining 1210 that a UE, which is in an inactive state or in an idle state, is to be informed of the availability state of a RS; determining a starting time that is to be indicated to the UE, wherein the starting time is a time as of which the UE is expected to: i) use the RS if the availability state corresponds to an available state of the RS, and to ii) not use the RS if the availability state corresponds to an unavailable state of the RS; generating a signalling that a) indicates the starting time, and b) includes an availability indication indicating the availability state of the RS; and transmitting 1220 the signalling. The base station (e.g., the transceiver 670) may also transmit 1240 the RS in accordance with the availability indication transmitted 1220 to UE. That is, when the availability indication indicates that the RS is available (yes in 1230), the base station may also start transmitting 1240 the RS at least as of the validity starting time that the UE is expected to determine for the availability indication.

It is further noted that any of the steps/operations described below may be performed or controlled by the circuitry 630 (on the UE side) and/or the circuitry 680 (on the base station side).

In the further description, the details and embodiments apply to each of the transceiver device, the scheduling device (or scheduling nodes) and the methods unless explicit statement or context indicates otherwise. In particular, it is noted that, since a UE and a network node from a communication system and in which the UE uses the RS(s), the UE and the network node will have to know/determine the same starting time/end time/validity time. Thus, in general, the UE and network node may individually determine the expected UE behavior using the same methods or using methods that at least yield the same result. In other words, the determination methods of the starting time/end time/validity time according to the present disclosure may in general be performed at the side of the UE and/or base station (network node).

However, while the UE may determine the starting time/end time/validity period based on the received signalling, the base station may generate said signalling such that the UE determines an appropriate starting time/end time/validity period. i.e., the starting time/end time/validity period that the base station has determined to be indicated to the UE. The base station may determine the starting time/end time/validity time to be indicated to the UE based, e.g., on the intended time it intends to stop transmitting or start transmitting the respective RS.

In the design of the NR, and especially in Rel. 17, efficient power saving has been one of aims. In particular, enhancements for idle or inactive-mode UE power saving, considering system performance aspects of physical layer (L1) and MAC layer are desirable. For example, paging enhancement(s) to reduce unnecessary UE paging receptions, subject to no impact to legacy UEs have been studied and discussed. Moreover, the possibility of providing potential TRS/CSI-RS occasion(s) which have been available in the connected mode to the idle/inactive-mode UEs, while minimizing system overhead impact has been discussed. An always-on TRS/CSI-RS transmission by a gNB should not be required.

Similarly, further enhancements on power saving techniques for connected-mode UE, subject to minimized system performance impact are desirable. In particular, extension(s) to Rel-16 DCI-based power saving adaptation during DRX Active Time for an active BWP, including PDCCH monitoring reduction when C-DRX is configured have been studied. Moreover, the feasibility and performance impact of relaxing UE measurements for RLM and/or BFD, particularly for low mobility UE with short DRX periodicity/cycle have been studied.

Paging Early Indication

For potential paging enhancements, there has been a possibility studied concerning transmission of a Paging Early Indication (PEI). The PEI is received before a target paging occasion (PO) to indicate to the UE whether or not to monitor the PDCCH scrambled with the P-RNTI at the PO. In other words, With the PEI, the UE is not required to monitor all paging occasions. Rather, the PEI informs the UE whether or not it shall monitor the next PO(s). The transmission of the PEI has not yet been standardized and there are several possibilities to provide the PEI. For example, the PEI may be DCI-based. This means that the UE monitors a DCI to detect the value of the PEI. The DCI including PEI may be an existing DCI extended to carry the PEI. For example, DCI format 1_0 or 2_6 may be used for this purpose. This extension may be performed by utilizing one of reserved bits or values, or in another way. Another possibility is to define a new DCI format to convey the PEI.

However, the PEI is not necessarily to be transmitted over a DCI. Alternatively, or in addition to the DCI based concept, the PEI may be RS-based or sequence-based. In such case, a synchronization signal (e.g., the SSS) or a reference signal (e.g., a TRS or a CSI-RS or the like) ay carry the PEI. For example, the PEI may be indicated by the selection of the SSS to be transmitted, among a plurality of predefined synchronization signals. A first of the synchronization signals out of the plurality may indicate a first PEI value (e.g., indicate to a UE to read upcoming PO(s)) while a second of the synchronization signals out of the plurality may indicate a second PEI value (e.g., indicate to a UE not to read the PO(s)). Similarly, a selection of a RS sequence out of a plurality of predefined RS sequences may indicate different values of the PEI.

PEI may be used by non-legacy UEs, while still the legacy paging procedure may be used by legacy UEs (which comply with NR releases that do not support PEI). What such PEI does can be seen as introducing a two-step paging approach, or sub-grouping. In general, PEI is not the only possible approach to subgrouping. Instead, multiple P-PNTIs may be used or additional reception occasions introduced in time and/or frequency domain. However, for the idle and inactive more, paging early indication before the paging occasion(s) has been studies and agreed upon. It is noted that the present disclosure is readily applicable in combination with the PEI-based approach, but is not limited thereto. It may in fact also work with the legacy paging or any other approach.

Reference Signal Availability Indication

As mentioned above, the availability of the TRS/CSI-RS is already signaled to UEs in the connected state. In principle, availability of any kind of reference signal may be signaled. When the reference signal is transmitted and available to connected state UEs, it may be beneficial to provide the reference signal also for the idle and/or inactive state (state may be also referred to as mode in this disclosure).

For the information provided by a physical layer availability indication of the reference signal at the configured occasions to the idle and/or inactive UEs, one or more of the following possibilities can be supported:

- using a bitmap, where each bit is associated with at least one resource or resource configuration or a set (group) of resources. For example, a codepoint would indicate a state of availability and unavailability for all or some of configured reference signal resources.

value or codepoint to indicate one or more resources or resource configuration indices that correspond to available RS resources.

Timing of Availability and Non-Availability of the Reference Signals

As mentioned above, TRS (are similar to CSI-RS, but serve the purpose of tracking synchronization) have been originally configured and transmitted only for the CONNECTED state UEs. Thus, the IDLE or inactive state UEs have had no possibility of tracking the synchronization apart from the synchronization procedure based on the reception of the PSS and SSS. However, it may be advantageous to provide also the IDLE and inactive mode UEs with such reference signals, especially when the overhead can be kept reasonable. Accordingly, based on the TRS transmission status on whether it is stably present, the gNB may send the TRS availability indication to IDLE/INACTIVE UEs, who can also share the TRS used for the time/frequency tracking and serving cell measurement.

Thus, the RSs (or, as a particular example TRS) which are configured for the CONNECTED state UE's may be also used by the IDLE or inactive state UEs. When referring to "stable present" above, what is meant is that there are RSs with the same configuration present over certain time, so that even IDLE/inactive UEs may have chance to make use of them.

In the current standard drafts and discussion in 3GPP, after a UE has received the physical layer TRS availability indication, the UE behavior and assumption on when RS to be applicable is not defined. The physical layer indication means the L1 (layer 1) signaling, e.g., a PEI (paging early indication) or a paging DCI or the like, as a contrast to, e.g., RRC signaling which is sometimes also referred to as higher-layer signaling.

The opportunity for an IDLE and/or INACTIVE UE to monitor the L1 signaling is once per paging cycle, which can be for instance 320 ms, 640 ms, 1.28 s or 2.56 s. Without a clear definition on how and when a UE assumes the availability/unavailability of TRS after reception of the indication, some ambiguity may occur in the behavior between the gNB and the UE. For instance, if a UE starts to assume the TRS is present, before the TRS is transmitted, or if a UE still assumes that the TRS is present, after the TRS is stopped being transmitted. Such ambiguity is due to the gNB which may decide when to indicate availability of the RS. It is noted that even though RSs are present in the configured resources, and, for instance provided to the CONNECTED state UEs, the gNB does not have to signal that these RSs are available also for the IDLE/INACTIVE UE's.

Figure 8:
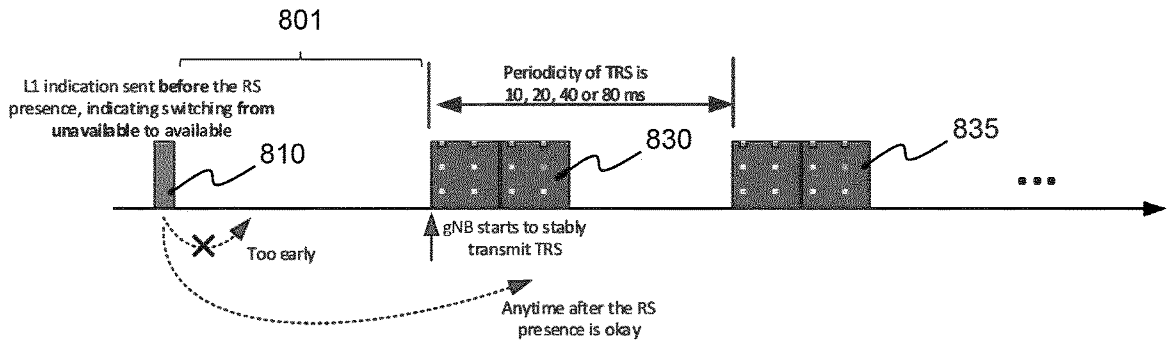
FIG. 8 is a schematic drawing illustrating a case in which an RS availability indication is sent before the actual RS presence.
Figure 9:
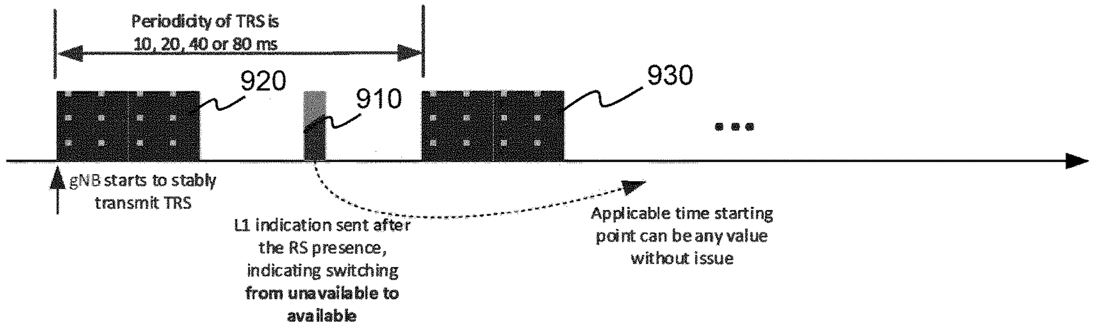
FIG. 9 is a schematic drawing illustrating a case in which the RS availability indication is sent after RS presence.

FIGS. 8 and 9 illustrate examples of a case of switching from unavailable to available. In such case, for a certain RS configuration (with periodicity and offset, frequency resource, pattern within a slot/RB, sequence configuration, etc.), it is possible that the RS starts to be transmitted either before or after the L1 indication (PEI or paging DCI). In order to may a use of the RSs reliably, the UE should be able to know that the RS is certainly present from starting some specific time instance. FIG. 8 shows an availability indication 810. This current availability indication is a first availability indication indicating "available" after at least one availability indication received recently (before the current availability indication) and indicating "unavailable". This can be also understood as the current availability indication indicating switching from unavailable RS to available RS. In FIG. 8, the first RS occasion is located some time 801 after the availability indication 810. If the UE starts using RSs immediately after receiving the availability indication 810, it will be too early because the gNB possibly does not yet (stably) transmit the RS. After the first RS occasion 830, further RS occasions (such as 835) follow periodically. e.g., with a period 10, 20, 40, or 80 ms. If the UE starts using the RSs to early, the RSs may not be actually present and the UE may be unable to track the synchronization.

FIG. 9 shows an example in which the base station (gNB) transmits the availability indication only after it already stably transmits the RS. The stable transmission of the RS starts with the RS occasion 920. Then, the availability indication 910 is received by the UE indicating change from unavailable to available. The UE starts then using the RS at the next RS occasion 930. In this case, the UE will be able to detect the RS correctly.

Figure 10:
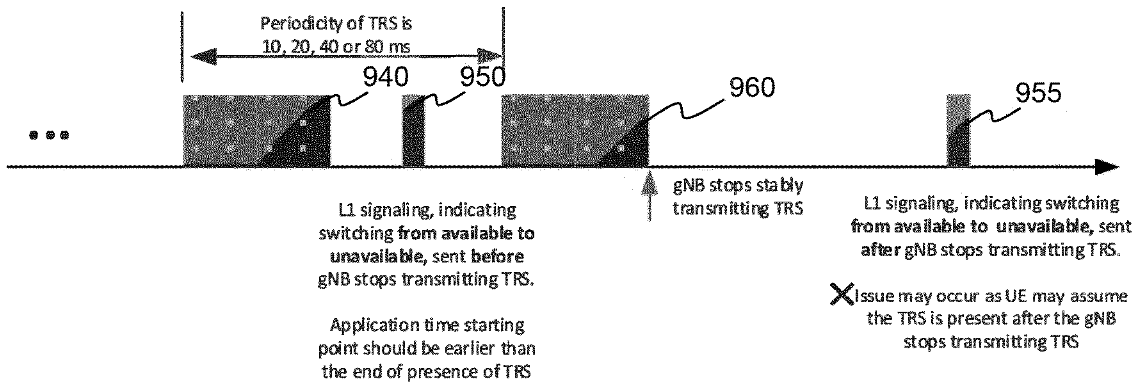
FIG. 10 is a schematic drawing illustrating a case in which the RS unavailability indication is sent before and after RS presence.

FIG. 10 illustrates an example in which there is switching from available to unavailable. In such case, it is better to indicate such switching in advance, before gNB stops transmitting the RS. Otherwise, if gNB firstly stops transmitting the RS and then indicates the unavailability, this may cause UE ambiguity when using the RS, e.g., for serving cell measurement. FIG. 10 illustrates both cases: RS occasions 940 and 960 are shown, out of which the occasion 960 is the last one transmitted. An availability indication 950 is received early enough, so that the UE may stop using the RS until the last RS occasion 960. An availability indication 955 is received too late after the last RS occasion 960. An issue may arise, if the UE tries to use signal detected at a position in which no longer any RS is transmitted.

According to the examples of FIGS. 8-10, it may be desirable to define the UE behavior with as little overhead as possible and to avoid ambiguity and/or misalignment between the gNB and UE. The BS may take the expected behavior of the UE into account when planning the RS transmission and the corresponding availability indications. For a L1 signaling, the starting time for the availability indication to take effect may be defined by a fixed time duration, e.g., the KO value contained in the DCI or a NO value defined by UE capability.

For CONNECTED mode UEs, the activation and deactivation of semi-persistent CSI-RS is performed by a MAC CE (control element) and the application delay for both is 3 ms, which is defined by $$n+3N_{slot}^{subframe,\mu}.$$

As the indication may involve multiple RS configurations and the opportunity for an IDLE/INACTIVE UE to monitor the L1 signaling is once per paging cycle, which can be 320 ms, 640 ms, 1.28 s or 2.56 s, to apply the indication timely as ordinary L1/L2(MAC) signaling is not practical. The indication should be ahead of switching from available to unavailable, to avoid the issues shown in FIG. 10. For earlier and efficient RS usage, the indication of switching from unavailable to available can be before or after the actual RS presence, based on gNB scheduling preference. According to some embodiments presented below, for availability and unavailability indication for a certain RS configuration, UE decides the start and end timing to take effect, based on whether the indication indicates "available" or the indication indicates "unavailable".

Determination of Validity Starting Time

In the following, several methods to determine the *validity starting time* (also referred to as *starting time*) are represented. It is noted that the term validity starting time refers to the time as of which the indicated state of the RS (e.g., "available"/"unavailable") applies, i.e., when the RS availability/unavailability as indicated starts to take effect and/or becomes valid. In other words, the starting time refers to the time as of which the UE is expected to use the RS if the (indicated) availability state corresponds to an available state of the RS, and not use the RS if the (indicated) availability state corresponds to an unavailable state of the RS.

In general, the starting time may correspond to an RS occasion. For instance, when the availability indication indicates "available" (and the present state of the RS is "unavailable"), the starting time may correspond or be the first RS occasion, at which the UE is expected to use or measure the RS. Likewise, when the availability indication indicates "unavailable" (and the present state of the RS is "available"), the starting time may correspond or be the first RS occasion, at which the UE is expected to not use or measure the RS. In other words, the first RS occasion may be the RS occasion at which the UE is expected to start or stop using the RS in accordance with the availability indication. Thus, in general, the UE may determine a starting time when a state indicated by the availability indication is different state than the present state of the RS. In other words, the UE may determine a starting time when the availability indication indicates a change of the availability of the RS and/or a change of the expected UE behavior.

Starting Time Indication Based on Positive Paging Occasion

Figure 11:
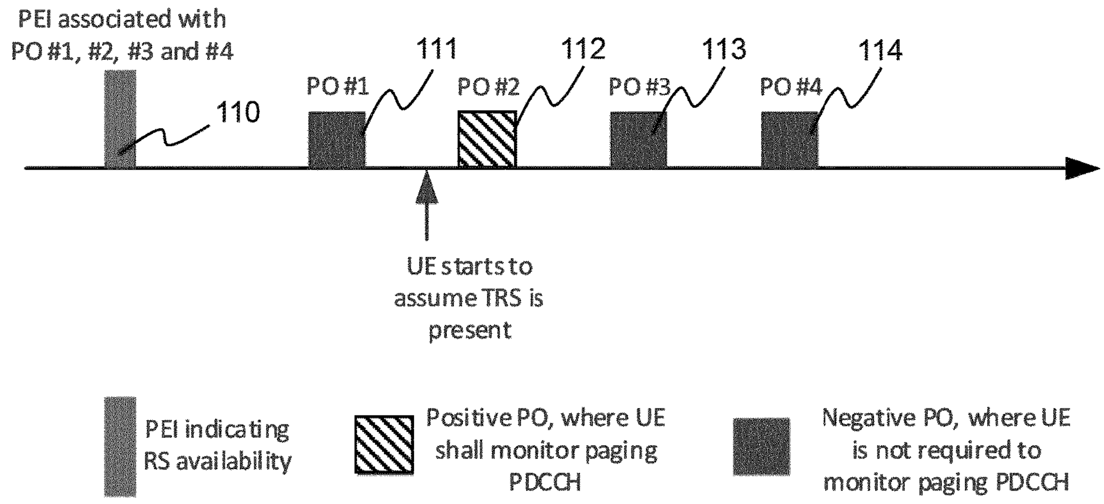
FIG. 11 is a schematic drawing illustrating an exemplary determination/indication of a validity starting time based on the positive paging occasion indicated by a PEI.

In general, the availability signalling may include an indication indicating i) one or more POs that are to be monitored by the UE and/or ii) which of a plurality of POs are to be monitored by the UE. Here, *positive Pos* are POs in which the UE is expected to monitor a paging physical downlink control channel (PDCCH). In other words, the term positive POs refers to paging messages, which are, e.g., transmitted over a paging PDCCH, that the UE is expected to receive. The UE (e.g., circuitry 630) may then obtain, from the signalling, an indication indicating positive paging occasions (POs), among the configured POs. For instance, as illustrated in FIG. 11, the availability signalling may include a PEI, which indicates the positive POs. More specifically, in the example shown in FIG. 11, the PEI 110 indicates that the PO #2 112 is a positive PO, which is to be monitored by the UE. Furthermore, there PO #1 111, PO #2, 113, and PO #4 114, which are *negative Pos*, the UE is not required to monitor. In general, the PEI may explicitly indicate that PO #1 111, PO #2, 113, and PO #4 114 are negative POs or may indicate that they are negative POs implicitly by not indicating that they are positive POs.

In general, when the availability signalling includes an indication of POs, in particular positive POs, the UE may then determine the starting time based on one or more of the obtained positive POs. For instance, the starting time may be or correspond to the first or last positive PO indicated by the availability signalling. In particular, the UE (e.g., circuitry 630) may determine the starting time based on: a first positive PO among the positive POs when the (indicated) availability state corresponds to the available state; and/or a last positive PO among the positive POs, when the (indicated) availability state corresponds to the unavailable state.

For instance, the slot with the first positive PO, or the slot with the last positive PO may be or correspond to the starting time. In particular, the UE (e.g., circuitry 630) may determine that the starting time corresponds to (or is) the RS occasion that is closest to i) the first positive PO among RS occasions that are before the first positive PO, when the (indicated) availability state corresponds to the available state and/or ii) the last positive PO among RS occasions that are after the last positive PO, when the (indicated) availability state corresponds to the unavailable state.

When the indication is carried by a L1 signaling, which indicates one or more RS configurations as available, if the L1 signaling is associated with one or more POs, the validity starting time may be determined by the slot with the first positive PO. For instance, as illustrated in FIG. 11, the UE may assume that the RS starts to be present from the closest RS occasion before the positive PO. However, the present disclosure is not limited thereto as, in some embodiments, the UE assumes that the RS starts to be present from a slot with an offset from the slot with positive PO, i.e., n−N_offset, where N_offset can be configured in SIB or may be a fixed/default value (e.g., an integer value), and n is slot with the first positive PO.

Similarly, when a L1 signaling indicates one or more RS configurations as unavailable, if the L1 signaling is associated with one or more POs, the validity starting time may be determined by the slot with the last positive PO. For instance, the starting time may be after the slot with the last positive PO.

Using (only) the POs for determining/indicating the starting time may allow for zero additional overhead when the RS availability indication is associated with the presence of paging.

Starting Time Indication Based on Reference Paging Occasion(s)

In general, the availability signalling may include a validity *starting time indication*, which indicates the starting time. For instance, the validity starting time may be explicitly signaled by the availability signalling/L1 signaling by referring to a certain PO and, for instance, the validity starting time may be from or after said certain PO. The UE (e.g., circuitry 630) may then obtain, from the availability signalling, the validity starting time indication that indicates a PO among configured POs as starting time reference PO.

For instance, said starting time indication ma indicate or refer to a configured PO, also referred to as starting time reference PO or *reference PO*. It is noted that the reference PO, which may be a positive or a negative PO, is used for indicating the starting time to the UE. That is, the indication of the reference PO may have nothing to do with whether the PO is positive or negative, if also indicated by the availability signaling.

The UE may then for instance determine that the starting time corresponds to an RS occasion that is closest to the indicated reference PO among the RS occasions of the RS that are after the indicated reference PO. However, the present disclosure is not limited thereto as in some embodiments the UE determines that the starting time corresponds to an RS occasion that is the closest to the indicated reference PO among the RS occasions of the RS that are before the indicated reference PO. Furthermore, in other embodiments, the UE determines that the starting time corresponds to an RS occasion that is closest to the indicated reference PO among the RS occasions of said RS. Furthermore, in other embodiments, the UE determines that the starting time corresponds to an RS occasion that is closest to the indicated reference PO among the RS occasions that are not after the indicated reference PO. Moreover, in yet other embodiments, the UE determines that the starting time corresponds to an RS occasion that is closest to the indicated reference PO among the RS occasions that are not before the indicated reference PO. In other words, the starting time may be the RS occasion that is closest (in time) to the indicated reference PO among the RS that are before, after, not before, or not after the indicated reference PO.

It is further noted that the validity starting time indication can be per RS configuration or for all the RS configurations, for which the signalling contains an availability indication. More specifically, in general the may be plurality of RSs (e.g., a plurality of RS configurations), and the availability signalling may include, for each of said RSs, an availability indication that indicates an availability state of the respective RS. The UE may then obtains, for each of said RSs, the respective availability indication. Moreover, the UE may determine, for each of the RSs, based on the availability indication of the RS, an availability state of the RS.

However the present disclosure is not limited thereto as, in some embodiments, the availability signalling includes an availability indication that indicates, for each RS of a plurality of RSs, an availability state of the RSs, and the UE obtains said availability indication and determines, based on the availability indication, for each of the RSs an availability state of the RS. Furthermore, the UE may determine, for each of the RSs, a starting time as of which the UE is expected to use the RS if the availability state of the RS corresponds to an available state of the RS, and not use the RS if the availability state of the RS corresponds to an unavailable state of the RS. In particular, the UE may determine, for each of the RSs, that the starting time of the RS corresponds to an RS occasion that is closest to the indicated starting time reference PO among RS occasions of the RS that are after a starting time reference PO indicated for said RS. However, the present disclosure is not limited thereto as in some embodiments the UE determines, for each of the RSs, that the starting time corresponds to an RS occasion that is the closest to the indicated reference PO among the RS occasions of the RS that are before the indicated reference PO. Furthermore, in other embodiments, the UE determines, for each of the RSs, that the starting time corresponds to an RS occasion that is closest to the indicated reference PO among the RS occasions of said RS. Furthermore, in yet other embodiments, the UE determines, for each of the RSs, that the starting time corresponds to an RS occasion that is closest to the indicated reference PO among the RS occasions that are not after the indicated reference PO. Moreover, in yet other embodiments, the UE determines, for each of the RSs, that the starting time corresponds to an RS occasion that is closest to the indicated reference PO among the RS occasions that are not before the indicated reference PO. In other words, the starting time may be, for each of the RSs, the RS occasion that is closest (in time) to the indicated reference PO among the RS that are before, after, not before, or not after the indicated reference PO.

At this, the validity starting time indication may indicate: i) for each of the RSs, a starting time reference PO; ii) a starting time reference PO for all of the RSs; or iii) a first starting time reference PO for those of the RSs for which the indicated availability state corresponds to an available state of the RS, and a second starting time reference PO for those of the RSs for which the indicated availability state corresponds to an unavailable state of the RS. In other words, the timing points can be configured differently for the availability and unavailability, respectively. In other words, the validity starting time indication may indicate one reference PO for all RSs; two reference POs (one for the available and one for the unavailable RSs); or one reference PO for each of the RSs. The UE may then determine, for each of the RSs, the respective starting time of said RS using the reference PO indicated for said RS.

Indicating the starting time by indicating one or more reference POs by the availability indication may facilitate the scheduling device to control the starting time in a flexible manner.

Starting Time Indication Based on Reception Time and Configured Time Points

In general the starting time may be determined based on the reception (time) of the signalling by the transceiver, which refers to the time the UE (e.g., its transceiver) received the availability signalling and is also referred to as the *reception time*.

For instance, the starting time may be determined based on the configured time point that is the closest to the reception time among a plurality of configured time points. Thus, when it is indicated to the UE that one or more RS configurations are available or unavailable, the UE may assume the validity starting time is the configured time point closest to (and, e.g., not earlier than) the reception time.

However, in general, the timing points or intervals can be configured differently for the availability and unavailability, respectively. The UE (e.g., circuitry 630) may then determine that the starting time corresponds to a first configured time point, when the (indicated) availability state corresponds to the available state, and/or the starting time corresponds to a second configured time point, when the (indicated) availability state corresponds to the unavailable state. In other words, when the availability state of an RS corresponds to the available state, the corresponding starting time may be determined/indicated based on the configured time point that is the closest among a first plurality of configured time points, whereas, when the availability state of an RS corresponds to the unavailable state, the corresponding starting time may be determined/indicated based on the configured time point that is the closest among a second plurality of configured time points. In particular, the first and the second plurality of time points may be identical or different.

For instance, when the availability state of an RS corresponds to the available state, the starting time may correspond to the closest configured PO among configured PO; whereas, when the availability state of an RS corresponds to the unavailable state, the starting time may correspond to the closest configured start of a paging cycle (e.g., the start time of the next paging cycle).

In general, the first configured time point may be one of: i) the start of the next paging cycle among configured paging cycles; ii) the start of the next paging frame (PF) among configured PFs; iii) the next paging occasion (PO) among configured POs. The second configured time point may be one of: i) the start of the next paging cycle among configured paging cycles; ii) the start of the next PF among configured PFs and iii) the next PO among configured POs. In other words, the first and/or the second plurality of configured time points may include the configured paging cycles, the configured PFs, and/or the configured POs (e.g., configured by SIB).

Indicating (scheduling device side)/determining (UE side) the validity starting time based on the reception time can be more flexible and controlled by the network based on the status of one or more RS configurations and indication timing. There is also no additional L1 signaling overhead.

Starting Time Indication Based on Reception Time and Indicated Offset

In general, the availability signalling may (e.g., explicitly) indicate the starting time. For instance, the UE (the circuitry 630) may obtain, from the signalling, an indication indicating an offset (e.g., a time period), and determine that the starting time as the reception of the signalling by the transceiver offset by the indicated offset.

Here, it should be noted that in the present disclosure the "*offset by*" an offset may mean plus. i.e., the starting time may be a time that is a time period that corresponds to the offset after the reception time. However, this this not necessarily mean that the reception time is offset only/just by the indicated offset. In other words, the reception time may be offset by at least the offset. In yet other words, said phrase may mean that i) the respective starting time is determined using the indicated offset; and/or ii) the starting time is determined as the reception of the signalling by the transceiver offset with the indicated offset.

In other words, the starting time may be the reception time plus the indicated offset, or, in other words, the starting time may be a time that is a time period after the reception time. Here, in general, the term *offset* refers to a time period or time length. The offset may, for instance, be N times a predetermined time unit, and the indication indicating the offset may indicate the value of N (N may be an integer greater than or equal to zero). Thus, the predetermined time unit may be a (predetermined) time period or length. Examples for the predetermined time unit or *time granularity* are one or more paging cycles, paging occasions (POs) intervals, paging frames (PFs) intervals, slots, or radio frames.

Summarizing the above, the validity starting time may in general be an offset of a number of certain time granularity from the instance where availability indication (or the availability signalling) is received, and the number value may be signaled or indicated by the availability signalling, i.e., a PEI or a paging DCI.

In general, the present embodiment may work by indicating the offset via combination of an L2 and L1 signalling. For instance, the time granularity may be signaled and/or configured. For instance, the time granularity may be configured by a layer 2 (L2) signalling (e.g., via a SIB) and the multiplicity of the granularity may be indicated by the availability signalling (e.g., a layer 1 (L1)) signalling.

However, the present disclosure is not limited thereto: the SIB may also configure a number of offset value candidates and the L1 signaling may indicate one of them. For instance, the availability signalling may indicate one of a plurality of configured offsets or one of a plurality of configured values of N.

However, the present disclosure is not limited to using also a L2 signalling: the time granularity may also be a fixed time period, or a default time period. In this case, the offset may be indicated (e.g., just or only) by the value of N indicated by the availability signalling.

It is further noted that the validity starting time indication can be per RS configuration or for all the RS configurations contained in the indication. In other words, if the availability signalling indicates the availability status for more than one RS, the availability signalling may, for each of said RSs, indicate a respective offset; or may indicate one offset for all of said RSs.

However, the present disclosure is not limited thereto: in some embodiments, the timing points or intervals can also be configured differently for the availability and unavailability, respectively. In other words, the availability signalling may in general indicate two offsets: a first offset that is used to indicate (scheduling device side)/determine (UE side) starting time for the RS(s) for which the (indicated) availability state corresponds to the available state, and a second offset that is used to indicate (scheduling device side)/determine (UE side) starting time for the RS(s) for which the (indicated) availability state to the unavailable state. The first and the second offset may be different.

Indicating the offset explicitly allows a flexible control by the network (e.g., the scheduling device) of validity starting time(s) that will be assumed by the UEs.

Starting Time Indication Based on Reception Time and Fixed/Default Offset

However, the present disclosure is not limited to an indication of the offset. For instance, the UE (its circuitry) may determine the starting time as the reception of the signalling by the transceiver offset by a predetermined offset. In particular, the predetermined offset (time duration) may be a fixed/default time duration.

For instance, when it is indicated to the UE that one or more RS configurations are available or unavailable, the UE may assume that the validity starting time is from a fixed/default offset value relative to the time instance where the UE receives the indication. The fixed/default offset is known by gNB and UE (e.g., without signalling in the availability indication) and may, e.g., be N slots or radio frames, where N=1, 2, . . . is an known/fixed/default integer. Such a predetermined offset (or N) may for instance be defined in a standard. The availability indication may then start to be valid with the fixed/default offset value relative to the time instance where the UE receives the availability indication/signalling (similar to the case of the indicated offset already explained above).

The offset value can be different for the availability and unavailability, respectively. In other words, there may be two fixed/default offset values: a first offset that is used to indicate (scheduling device side)/determine (UE side) starting time for the RS(s) for which the (indicated) availability state corresponds to the available state, and a second offset that is used to indicate (scheduling device side)/determine (UE side) starting time for the RS(s) for which the (indicated) availability state to the unavailable state. The first and the second offset may be different.

Using a fixed or default offset has the advantage of a small specification impact and zero control overhead.

Starting Time Indication Depending on Indicated State

In general, the above described methods for determining the starting time may be combined. For instance, when the indicated availability state corresponds to the available state a first of the above methods for determining the starting time may be used and, when the availability state corresponds to the unavailable state, a second of the above methods may be used. When there multiple RSs for which the availability indication indicates an availability state, a first method may be used for the RS(s) for which (indicated) availability state corresponds to the available state, and a second method may be used for the RS(s) for which (indicated) availability state corresponds to the unavailable state. Here, the first and the second method may be different. In particular, the starting time may be determined differently and/or the UE behavior may be different depending on whether the RS is indicated to be available or unavailable.

For instance, in some embodiments, if the (indicated) availability state corresponds to the available state, the UE (e.g., circuitry 630) obtains, from the signalling, an indication indicating the positive POs among configured POs, wherein the positive POs are POs in which the UE is expected to monitor a paging PDCCH. If the (indicated) availability state corresponds to the available state, the UE determines that the starting time corresponds to an RS occasion that is closest to the first positive PO among the RS occasions that are before the first positive PO. If, on the other hand, the (indicated) availability state corresponds to the unavailable state, the UE determines the starting time as the reception time of the signalling by the transceiver offset by a predetermined offset.

Thereby, additional overhead may be avoided when the RS availability is indicated, and the RS presence is associated with positive PO. When unavailability is indicated, whether RS is present or not does not have to be associated with a positive or negative PO, which may have zero overhead and a small specification impact. In other words, this is mostly for the case that RS should be available when there is paging; but if there is no paging, it can be more flexibly controlled by the network/scheduling device whether to transmit the RS.

Availability Indication "Without" Validity End Time

In general, a validity end time or validity duration, may be absent by default, or may be deemed absent if not configured.

Here the term *validity end time* refers, by analogy with validity start time, to the time as of which the indicated state of the RS (e.g., "available"/"unavailable") no longer applies, i.e., when the RS availability/unavailability as indicated starts no longer holds and/or becomes invalid. In other words, the validity end time refers to the time as of which the UE is expected to not use the RS if the (indicated) availability state corresponds to an available state of the RS, and use the RS if the (indicated) availability state corresponds to an unavailable state of the RS. That is, the validity end time may be the time point as of which the availability state that applied at/before the reception of the availability indication applies again, i.e., the time point as of which the UE returns to its original behavior of usage/non-usage of the RS.

Correspondingly, the term *validity duration* refers to the time period between validity start time and the validity end time. In general, the validity end time may be given/indicated in terms of the validity duration or vice versa.

No Expiration of Availability Indication

In general, the availability indication (e.g., the availability state(s) of the RS(s) indicated by the availability indication) may apply until another subsequent availability indication takes effect. In other words, the indicated availability state(s) may apply until indicated otherwise. Accordingly, the UE (e.g., circuitry 630) may determine, that the UE is expected to use the RS or not use the RS in accordance with the (indicated) availability state until indicated otherwise. Here "until indicated otherwise" may mean until the validity start time of another availability indication. That is, the indicated availability state(s) apply until the scheduling device "overwrites" the availability state(s).

More specifically, if the scheduling device or gNB indicates available (e.g., by means of an availability indication), the RS is assumed by UE to be available until scheduling device indicates unavailable. If, on the other hand, scheduling device indicates unavailable, the RS is assumed by UE to be unavailable until the scheduling device indicates available.

Changing the availability state of the RS(s) without an expiration time of the validity indication may reduce the overhead, in particular when the RS status does not change frequently.

Expiration of Availability Indication

However, the present disclosure is not limited to availability indications without expiration time of the validity indication in some embodiments the availability indication has an expiration time, which refers to an (natural) end of the validity of the availability indication without the scheduling device having to indicate this.

In these embodiments, the UE (e.g., circuitry 630) may determine that the UE is expected to use or not use the RS in accordance with the availability state indicated by the availability signalling until an end time. That is, after the determined end time the indicated availability state does no longer apply and i) the UE may stop using the RS when the availability indication indicated available, and ii) start using the RS when the availability indication indicated unavailable.

In general, the validity end time and/or validity duration may be configured by a System Information Block (SIB). That is, the end time and/or validity duration may be configured by the scheduling device by means of a SIB.

In general, a plurality of ending times may be configured by SIB. In particular, these end times may follow some periodicity. That is, each two consecutive/subsequent end times may be separated by the same time duration. The validity end time that applies to a given availability indication may then be the next of configured end times (e.g., next in time after the start time of the availability indication). For instance, the ending times may be every paging cycle within the RS configurations (or e.g., every radio frame), and the availability indication may be valid till the start of the next paging cycle.

In general, the validity duration or validity end time may be configured differently or identically for the availability and unavailability, respectively. For instance, a first validity duration may be configured for the indication of the available state and a second (e.g., different than the first) corresponds validity duration may be configured for the indication of the unavailable state. That is, The UE may then be expected to stop using an RS that is indicated as available after the first validity duration from the reception time, but start using an RS that is indicated as unavailable after the second validity duration from the reception time. Furthermore, different or identical validity durations or validity end times may be configured for different RS configurations.

Configuring the validity duration or validity end time via SIB may allow some flexibility to the network to tradeoff between signaling overhead to refresh the RS status depending on how frequent the RS status may change and the possibly maximum ambiguity duration in case of miss detection.

In general, the validity duration be a fixed or default validity duration, e.g., specified in a standard. Likewise, a validity end time may be a fixed or default validity end time. In other words a fixed/default duration or fixed/default end points may be used, e.g., certain number of radio frames, one or several paging cycles. In case of a fixed/default end points, the next fixed/default end point of said fixed/default end points following the starting point may be used as the endpoint. However, the present disclosure is not limited thereto as in some embodiments the next but one or the next but two end points following the starting point may be used as the endpoint.

Using a fixed/default duration or fixed/default end points may have a small specification impact and no control overhead. Furthermore, if the UE fails to detect the availability indication, it may recover from the ambiguity after the validity period/end time. In general, what is been said above for the SIB-configured case also applies to the fixed/default duration/end points. In particular, as in the SIB-configured case, there may be a different fixed/default validity duration or validity end time for the "available" and "unavailable" indication(s), respectively; and/or different validity duration or validity end time may be configured for different RS configurations.

In general, the end time or the validity duration may also be indicated by the availability indication. In particular, the availability indication may include an indication of the end time or the validity duration. In general, what is been said above for the SIB-configured case also applies to the indication included in the availability indication. In particular, as in the SIB-configured case, different validity duration or validity end time may be indicated for the "available" and "unavailable" indication(s), respectively; and/or different validity duration or validity end time may be configured for different RS configurations.

An indication of the validity duration and/or validity end time by the validity indication may provide an increased flexibility for the scheduling device.

Validity End Time Depending on Indicated State

In general, the above described methods for determining the expiration/validity time may be combined. For instance, when the indicated availability state corresponds to the available state a first of the above methods for determining the expiration/validity time may be used and, when the availability state corresponds to the unavailable state, a second of the above methods may be used. When there multiple RSs for which the availability indication indicates an availability state, a first method may be used for the RS(s) for which (indicated) availability state corresponds to the available state, and a second method may be used for the RS(s) for which (indicated) availability state corresponds to the unavailable state. Here, the first and the second method may be different. In particular, the expiration/validity time may be determined differently and/or the UE behavior may be different depending on whether the RS is indicated to be available or unavailable.

For instance, the UE (e.g., circuitry 630) may determine, that the UE is expected to use or not use the RS in accordance with the availability state indicated by the signalling until: an end time configured by a System Information Block (SIB) when the (indicated) availability state corresponds to the available state; and until indicated otherwise, when the (indicated) availability state corresponds to the unavailable state.

This particular combination of methods for determining the validity time of the availability indication may provide a good tradeoff between network control flexibility, control overhead, and standard normalization efforts.

Availability Indication for Synchronization Signal Block (SSB) Beams

As already mentioned above, the efficient indication of the present disclosure may also be used for indicating the availability state of an SSB beam rather than indicating the availability state of a RS (in particular, by replacing the term "reference signal" by the term "SSB beam"). In particular, the validity period of an SSB beam availability indication (in particular, one or more of the validity starting time, validity duration, and validity end time of an availability indication) may be derived/determined as described above for the RS availability indication.

Furthermore, availability indication(s) for one or more reference signals may be combined with availability indication(s) for one or more SSB beam(s). For instance, the availability signalling may include an availability indication for a reference signal and an availability indication for a SSB beam, and the scheduling device/UE may perform the respective steps (in particular, the obtaining of the availability state and the determining of validity starting/period/end time) for each of the RS and the SSB beam. At this, for each of the RS(s) and SSB beam(s) for which the availability signalling includes an availability indication, the respective availability state and/or validity period (starting time, end time, and/or duration) may be indicated (base station side) and determined (UE side) according to a same method/approach of the above-described methods/approaches. However, the present disclosure is not limited thereto as (i) for some RS(s) and/or SSB beams different methods of the above-described methods may be used, or (ii) for each RS and each SSB beam, a mutually different methods of the above-described methods may be used. In other words, the availability indications for RS(s) and availability indications for the SSB beam(s) may be arbitrarily combined with one another.

However, it should be noted that, in the context of an indication of the availability state of an SSB beam, the terms "on/off state" and "on-off state" may be also be used to refer the "availability state" of the SSB beam. In other words, the terms "on/off state", "on-off state", "availability state" and the like may be used interchangeably and refer to whether the respective signal/beam is transmitted by the scheduling device and, thus, can be received by the UE. Similarly, the terms "on-off indication" and "on/off indication" may be used for the term "availability indication". Moreover, similarly, the terms "on-state" and "off-state" may be used interchangeably to the terms "available state" and "unavailable state", respectively.

In general, the current SSB structure and signaling in SIB1 may be used, by the gNB, to indicate to the UE the SSB beams that the gNB is using. The gNB may then inform, using an on/off indications, the UE which beams shall be switched on or off during which period of time. For instance, a PDCCH in Common Search Space (CSS) may indicate the SSB beam's on-off state and the validity period of the indicated on/off-state. The PDCCH can be the PDCCH for Paging Early Indication (PEI), or paging PDCCH as already described above for the availability indication for the RS.

It is further noted that The SSB beam on-off indication may be transmitted to, received by, and used by RRC INACTIVE/IDLE and/or RRC CONNECTED UEs.

Beam Pattern Indication for SSB Beams

In general, the availability signalling may also include an indication (also referred to as *beam pattern indication*) indicating a beam pattern of one or more SSB beams.

In particular, an availability indication indicating an availability state of an SSB beam, may indicate a beam pattern of said SSB beam. For instance, a beam pattern indication for an SSB beam may indicate one or multiple of (i) a beam on-off bitmapping of one or more SSB beams, the one or more SSB beams including the SSB beam. (ii) that the SSB beam is quasi co-located (QCL) to another SSB beam, and/or (iii) a beam combining of the SSB beam with another SSB beam. Here, the other SSB beam refer to an SSB beam different from said SSB beam.

In general, an availability indication may indicate beam patterns of a plurality of SSB beams. For instance, the availability indication may indicate one or multiple of (i) a beam on-off bitmapping of the plurality of SSB beams. (ii) that the two or more SSB beams of the plurality of SSBs beams are quasi co-located (QCL) to one another, and/or (iii) a beam combining of two or more SSB beams of the plurality of SSB beams with one another.

Here, the beam on-off bitmapping may be a bitmap that indicates (i) an on-off indication for each of multiple SSB beams, and/or (ii) an on-off indication for each of multiple occasion of one particular SSB beam. More specifically, each bit of the bitmap may indicate whether: (i) the on-off state of a particular SSB beam is (e.g., for the duration of the validity period) the on-state or the off-state, and/or (ii) a particular transmission occasion of a particular SSB beam is actually used by the base station to transmit said SSB beam (in other words, the on-off state of said SSB beam is indicated for said particular occasion).

In general, the indication of the quasi co-location (QCL) of two SSB beams may be interpreted that said two beams are subject to very similar channel condition. In particular, they may be transmitted from the same location (e.g., same place and same antenna). In particular, said two beams may be transmitted from the same Transmission/Reception Point (TRP) and/or by the same antenna array that applies the same spatial filter. In consequence, the channel properties of one of the SSB beams may be used for detecting the other SSB beam. More details on QCL in NR can be found, for instance, in TS 38.214 (version 15.3.0), section 5.1.5.

Furthermore, beam combining may, for instance, be the combination of two or more (narrow) different beams into one/a (wider) beam. That is, a beam obtained by combining two or more beams may cover the solid angles of said two or more beams, from which it is obtained. More specifically, when a first and a second SSB beam are combined, the resulting beam may be transmitted (i) in each direction in which the first beam is transmitted, and (ii) in each direction in which the second beam is transmitted. Here, it should be noted that the beams to be combined are typically neighboring beams (i.e., are transmitted in adjacent directions), so that the resulting wider beam is transmitted into a continuous (e.g., connected) spatial domain. However, the present disclosure is not limited thereto. In general, a plurality of beams transmitted in any direction may be combined.

Furthermore, the (transmission) occasions of the new, combined beam may be the combination (i.e., the union) of the occasions of the two narrower beams. More specifically, when a first and a second SSB beam are combined, the resulting combined SSB beam may be transmitted at each transmission occasion of the first SSB beam and at each transmission occasions of the second SSB beam.

In general, the beam pattern indicated by a beam pattern indication may be different from a current beam pattern of the SSB beam. In particular, a change of the beam pattern may be indicated in the availability indication, for instance, as mentioned above by PDCCH.

Furthermore, in general, the indication indicating the beam pattern may indicate one of a plurality of beam patterns configured by a System Information Block (SIB). For instance, the available SSB beam patterns, e.g., including QCL between different beams, may be configured by a high-layer signalling such as in SIBx (e.g., any of SIB1 to SIB 9).

On-off adaptation and/or beam pattern adaptation of SSB beams may save network energy. In particular, depending on the cell load (in terms of UE numbers), traffic load and targeted coverage area, the support of beam on-off and beam pattern adaptation by a gNB/UE may enable network energy saving by adapting the number and pattern of SSB beams.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Furthermore, the various embodiments may also be implemented by means of software modules, which are executed by a processor or directly in hardware. Also a combination of software modules and a hardware implementation may be possible. The software modules may be stored on any kind of computer-readable storage media. In particular, according to another implementation, a non-transitory computer-readable recording medium is provided. The recording medium stores a program which, when executed by one or more processors, causes the one or more processors to carry out the steps of a method according to the present disclosure.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

It should be further noted that the individual features of the different embodiments may individually or in arbitrary combination be subject matter to another embodiment. It would be appreciated by a person skilled in the art that numerous variations and/or modifications may be made to the present disclosure as shown in the specific embodiments. The present embodiments are, therefore, to be considered in all respects to be illustrative and not restrictive.

Further Aspects

According to a first aspect, a user equipment, UE, is provided. The UE comprises a transceiver which, in operation, when the UE is in an inactive state or in an idle state, receives a signalling from a scheduling device; and circuitry which, in operation: (i) obtains from the signalling an availability indication indicating an availability state of a reference signal, RS, and (ii) determines: the availability state of the RS, and a starting time. The starting time is a time as of which the UE is expected to: use the RS if the availability state corresponds to an available state of the RS, and not use the RS if the availability state corresponds to an unavailable state of the RS.

In an exemplary implementation of the first aspect, the circuitry, in operation: obtains, from the signalling, an indication indicating positive paging occasions, POs, among configured POs, wherein the positive POs are POs in which the UE is expected to monitor a paging physical downlink control channel; and performs the determining based on one or more of the obtained positive POs.

For example, the circuitry, in operation, performs the determining based on: a first positive PO among the positive POs when the availability state corresponds to the available state; and/or a last positive PO among the positive POs, when the availability state corresponds to the unavailable state.

In an exemplary implementation of the first aspect, the circuitry, in operation, determines, in the determining, that the starting time corresponds to an RS occasion that is closest to: the first positive PO among RS occasions that are before the first positive PO, when the availability state corresponds to the available state; and/or the last positive PO among RS occasions that are after the last positive PO, when the availability state corresponds to the unavailable state.

In an exemplary implementation of the first aspect, the circuitry, in operation: obtains, from the signalling, a validity starting time indication that indicates a paging occasion, PO, among configured POs as starting time reference PO; and determines, in the determining, that the starting time corresponds to an RS occasion that is: (i) closest to the indicated starting time reference PO among RS occasions of the RS that are after the indicated starting time reference PO, or (ii) closest to the indicated starting time reference PO among RS occasions of the RS that are before the indicated starting time reference PO, or (ii) closest to the indicated starting time reference PO among RS occasions of the RS.

In an exemplary implementation of the first aspect, said RS is one of a plurality of RSs; the circuitry, in operation, determines, in the determining, based on the availability indication, for each of the RSs: (i) an availability state of the RS, and (ii) a starting time as of which the UE is expected to: use the RS if the availability state of the RS corresponds to an available state of the RS, and not use the RS if the availability state of the RS corresponds to an unavailable state of the RS.

In an exemplary implementation of the first aspect, the circuitry, in operation, determines, in the determining, for each of the RSs, that the starting time of the RS corresponds to an RS occasion that is: (i) closest to the indicated starting time reference PO for the RS among RS occasions of the RS that are after a starting time reference PO indicated for said RS, or (ii) closest to the indicated starting time reference PO for the RS among RS occasions of the RS that are before the starting time reference PO indicated for said RS; or (iii) closest to the indicated starting time reference PO among RS occasions of the RS, wherein the validity starting time indication indicates: for each of the RSs, a starting time reference PO; a starting time reference PO for all of the RSs; or a first starting time reference PO for those of the RSs for which the indicated availability state corresponds to an available state of the RS, and a second starting time reference PO for those of the RSs for which the indicated availability state corresponds to an unavailable state of the RS.

For example, the circuitry, in operation, determines, in the determining, that: the starting time corresponds to a first configured time point, when the availability state corresponds to the available state, and/or the starting time corresponds to a second configured time point, when the availability state corresponds to the unavailable state.

In an exemplary implementation of the first aspect, the first configured time point is a next paging cycle among configured paging cycles, a next paging frame. PF, among configured PFs, or a next paging occasion, PO among configured POs; and/or the second configured time point is a next paging cycle among configured paging cycles, a next PF among configured PFs, or a next PO among configured POs.

For instance, the circuitry, in operation: obtains, from the signalling, an indication indicating an offset; and determines, in the determining, the starting time as the reception of the signalling by the transceiver offset by the indicated offset.

In particular, the offset is an integer, N, times a predetermined time unit, and the indication indicating the offset indicates the integer N.

For example, the circuitry, in operation determines, in the determining, the starting time as the reception of the signalling by the transceiver offset by a predetermined offset.

In an exemplary implementation of the first aspect, the circuitry, in operation: (i) obtains, when the availability state corresponds to the available state, from the signalling, an indication indicating positive paging occasions, POs, among configured POs, wherein the positive POs are POs in which the UE is expected to monitor a paging physical downlink control channel, PDCCH; and (ii) determines, in the determining, when the availability state corresponds to the available state, that the starting time corresponds to an RS occasion that is closest to a first positive PO among RS occasions that are before the first positive PO; and (iii) determines, in the determining, when the availability state corresponds to the unavailable state, the starting time as the reception of the signalling by the transceiver offset by a predetermined offset.

For example, the circuitry, in operation, determines, that the UE is expected to use or not use the RS in accordance with the availability state indicated by the signalling until an end time, wherein the end time is: configured by a System Information Block, SIB; or fixed; or default; or indicated by the availability indication.

In an exemplary implementation of the first aspect, the circuitry, in operation, determines, that the UE is expected to: use the RS until indicated otherwise, when the availability state corresponds to the available state; and/or not use the RS in accordance with the availability state indicated by the signalling until indicated otherwise, when the availability state corresponds to the unavailable state.

In an exemplary implementation of the first aspect, the circuitry, in operation, determines, that the UE is expected to use or not use the RS in accordance with the availability state indicated by the signalling until: an end time configured by a System Information Block, SIB, when the availability state corresponds to the available state; and until indicated otherwise, when the availability state corresponds to the unavailable state.

According to a second aspect, a method for a user equipment, UE, the method including the steps of: receiving, when the UE is in an inactive state or in an idle state, a signalling from a scheduling device; obtaining, from the signalling, an availability indication indicating an availability state of a reference signal, RS; and determining (i) the availability state of the RS, and (ii) a starting time as of which the UE is expected to: use the RS if the availability state corresponds to an available state of the RS, and not use the RS if the availability state corresponds to an unavailable state of the RS.

According to a third aspect, a scheduling device is provided comprising: circuitry which, in operation: determines that a user equipment. UE, which is in an inactive state or in an idle state, is to be informed of the availability state of a RS; determines a starting time that is to be indicated to the UE, wherein the starting time is a time as of which the UE is expected to: use the RS if the availability state corresponds to an available state of the RS, and not use the RS if the availability state corresponds to an unavailable state of the RS; generates a signalling that: indicates the starting time, and includes an availability indication indicating the availability state of the RS; and a transceiver which, in operation, transmits the signalling.

According to a fourth aspect, a method is provided for a scheduling device, the method including the steps of: determining that a user equipment, UE, which is in an inactive state or in an idle state, is to be informed of the availability state of a RS; determining a starting time that is to be indicated to the UE, wherein the starting time is a time as of which the UE is expected to: (i) use the RS if the availability state corresponds to an available state of the RS, and (ii) not use the RS if the availability state corresponds to an unavailable state of the RS; generating a signalling that: indicates the starting time, and includes an availability indication indicating the availability state of the RS. The method further comprises transmitting the signalling.

Summarizing, provided are a communication device, a base station and respective methods for a communication device and a base station. The base station transmits and the communication device receives an availability indication, when the communication device is in an inactive state or in an idle state. The availability indication indicates an availability state of a reference signal (RS). The communication device then determines the availability state of the RS and a starting time as of which the communication device is expected to use the RS if the (indicated) availability state corresponds to an available state of the RS, and not use the RS if the (indicated) availability state corresponds to an unavailable state of the RS.

According to a fifth aspect, a user equipment. UE, is provided. The UE, comprises a transceiver which, in operation, when the UE is in an inactive state or in an idle state, receives a signalling from a scheduling device. Furthermore, the UE comprises circuitry which, in operation, (i) obtains from the signalling an on-off indication indicating an availability state of a synchronization signal block, SSB, beam, and (ii) determines the availability state of the SSB beam and a starting time. The starting time is a time as of which the UE is expected to use the SSB beam if the availability state corresponds to an on-state of the SSB beam, and not use the SSB beam if the availability state corresponds to an off-state of the SSB beam.

In an exemplary implementation of the fifth aspect, the circuitry, in operation, (i) obtains, from the signalling, an indication indicating positive paging occasions (POs) among configured POs, wherein the positive POs are POs in which the UE is expected to monitor a paging physical downlink control channel, and (ii) performs the determining based on one or more of the obtained positive POs.

For example, the circuitry, in operation, performs the determining based on (i) a first positive PO among the positive POs when the availability state corresponds to the on-state; and/or (ii) a last positive PO among the positive POs, when the availability state corresponds to the off-state.

In an exemplary implementation of the fifth aspect, the circuitry, in operation, determines, in the determining, that the starting time corresponds to an SSB beam occasion that is closest to (i) the first positive PO among SSB beam occasions that are before the first positive PO, when the availability state corresponds to the on-state; and/or (ii) the last positive PO among SSB beam occasions that are after the last positive PO, when the availability state corresponds to the off-state.

In an exemplary implementation of the fifth aspect, the circuitry, in operation, obtains, from the signalling, a validity starting time indication that indicates a paging occasion (PO) among configured POs as starting time reference PO. Furthermore, the circuitry determines in the determining, that the starting time corresponds to an SSB beam occasion that is: (i) closest to the indicated starting time reference PO among SSB beam occasions of the SSB beam that are after the indicated starting time reference PO, or (ii) closest to the indicated starting time reference PO among SSB beam occasions of the SSB beam that are before the indicated starting time reference PO, or (iii) closest to the indicated starting time reference PO among SSB beam occasions of the SSB beam.

In an exemplary implementation of the fifth aspect, said SSB beam is one of a plurality of SSB beams, and the circuitry, in operation, determines, in the determining, based on the on-off indication, for each of the SSB beams: an availability state of the SSB beam and a starting time as of which the UE is expected to: (i) use the SSB beam if the availability state of the SSB beam corresponds to an on-state of the SSB beam, and (ii) not use the SSB beam if the availability state of the SSB beam corresponds to an off-state of the SSB beam.

In an exemplary implementation of the fifth aspect, the circuitry, in operation, determines, in the determining, for each of the SSB beams, that the starting time of the SSB beam corresponds to an SSB beam occasion that is: (i) closest to the indicated starting time reference PO for the SSB beam among SSB beam occasions of the SSB beam that are after a starting time reference PO indicated for said SSB beam, (ii) closest to the indicated starting time reference PO for the SSB beam among SSB beam occasions of the SSB beam that are before the starting time reference PO indicated for said SSB beam, or (iii) closest to the indicated starting time reference PO among SSB beam occasions of the SSB beam, wherein the validity starting time indication indicates: (i) for each of the SSB beams, a starting time reference PO; (ii) a starting time reference PO for all of the SSB beams; or (iii) a first starting time reference PO for those of the SSB beams for which the indicated availability state corresponds to an on-state of the SSB beam, and a second starting time reference PO for those of the SSB beams for which the indicated availability state corresponds to an off-state of the SSB beam.

For example, the circuitry, in operation, determines, in the determining, that (i) the starting time corresponds to a first configured time point, when the availability state corresponds to the on-state, and/or (ii) the starting time corresponds to a second configured time point, when the availability state corresponds to the off-state.

In an exemplary implementation of the fifth aspect, the first configured time point is (i) a next paging cycle among configured paging cycles, (ii) a next paging frame (PF), among configured PFs, or (iii) a next paging occasion, PO among configured POs; and/or the second configured time point is (i) a next paging cycle among configured paging cycles, (ii) a next PF among configured PFs. or (iii) a next PO among configured POs.

For instance, the circuitry, in operation. (i) obtains, from the signalling, an indication indicating an offset; and (ii) determines, in the determining, the starting time as the reception of the signalling by the transceiver offset by the indicated offset.

For instance, the offset may be an integer, N, times a predetermined time unit, and the indication indicating the offset indicates the integer N.

For example, the circuitry, in operation determines, in the determining, the starting time as the reception of the signalling by the transceiver offset by a predetermined offset.

In an exemplary implementation of the fifth aspect, the circuitry, in operation: (i) obtains, when the availability state corresponds to the on-state, from the signalling, an indication indicating positive paging occasions (POs) among configured POs, wherein the positive POs are POs in which the UE is expected to monitor a paging physical downlink control channel, PDCCH; and (ii) determines, in the determining, when the availability state corresponds to the on-state, that the starting time corresponds to an SSB beam occasion that is closest to a first positive PO among SSB beam occasions that are before the first positive PO; and (iii) determines, in the determining, when the availability state corresponds to the off-state, the starting time as the reception of the signalling by the transceiver offset by a predetermined offset.

For example, the circuitry, in operation, determines, that the UE is expected to use or not use the SSB beam in accordance with the availability state indicated by the signalling until an end time, wherein the end time is: (i) configured by a System Information Block (SIB); or (ii) fixed; or (iii) default; or (iv) indicated by the on-off indication.

In an exemplary implementation of the fifth aspect, the circuitry, in operation, determines, that the UE is expected to: (i) use the SSB beam until indicated otherwise, when the availability state corresponds to the on-state; and/or (ii) not use the SSB beam in accordance with the availability state indicated by the signalling until indicated otherwise, when the availability state corresponds to the off-state.

In an exemplary implementation of the fifth aspect, the circuitry, in operation, determines, that the UE is expected to use or not use the SSB beam in accordance with the availability state indicated by the signalling (i) until an end time configured by a System Information Block (SIB), when the availability state corresponds to the on-state; and (ii) until indicated otherwise, when the availability state corresponds to the off-state.

In an exemplary implementation of the fifth aspect, the circuitry, in operation, obtains, from the signalling, an indication indicating a beam pattern of the SSB beam.

For example, the indication indicating the beam pattern indicates one or multiple of: (i) a beam on-off bitmapping of the SSB beams; (ii) that the SSB beam is quasi co-located (QCL) to another SSB beam; and/or (iii) a beam combining of the SSB beam with another SSB beam.

In an exemplary implementation of the fifth aspect, the indicated beam pattern is different from a current beam pattern of the SSB beam.

In an exemplary implementation of the fifth aspect, the indication indicating the beam pattern indicates one of a plurality of beam patterns configured by a System Information Block (SIB).

According to a sixth aspect, a method for a user equipment (UE) is provided, the method including the steps of: (i) receiving, when the UE is in an inactive state or in an idle state, a signalling from a scheduling device; (ii) obtaining, from the signalling, an on-off indication indicating an availability state of a synchronization signal block, SSB, beam; (iii) determining the availability state of the SSB beam; and (iv) determining a starting time as of which the UE is expected to (a) use the SSB beam if the availability state corresponds to an on-state of the SSB beam, and (b) not use the SSB beam if the availability state corresponds to an off-state of the SSB beam.

According to a seventh aspect, a scheduling device is provided, the scheduling device comprising circuitry which, in operation: (i) determines that a user equipment (UE), which is in an inactive state or in an idle state, is to be informed of the availability state of a synchronization signal block (SSB) beam; (ii) determines a starting time that is to be indicated to the UE, wherein the starting time is a time as of which the UE is expected to (a) use the SSB beam if the availability state corresponds to an on-state of the SSB beam, and (b) not use the SSB beam if the availability state corresponds to an off-state of the SSB beam; (iii) generates a signalling that indicates the starting time and includes an on-off indication indicating the availability state of the SSB beam. Furthermore, the scheduling device comprises a transceiver which, in operation, transmits the signalling.

According to an eighth aspect, a method is provided for a scheduling device, the method including the steps of: (i) determining that a user equipment (UE) which is in an inactive state or in an idle state, is to be informed of the availability state of a synchronization signal block (SSB) beam; (ii) determining a starting time that is to be indicated to the UE, wherein the starting time is a time as of which the UE is expected to (a) use the SSB beam if the availability state corresponds to an on-state of the SSB beam, and (b) not use the SSB beam if the availability state corresponds to an off-state of the SSB beam; (iii) generating a signalling that: indicates the starting time, and includes an on-off indication indicating the availability state of the SSB beam; and (iv) transmitting the signalling.

According to a ninth aspect, an integrated circuit is provided. The integrated circuit, in operation, controls a process of a user equipment (UE), the process including the steps of: (i) receiving, when the UE is in an inactive state or in an idle state, a signalling from a scheduling device; (ii) obtaining, from the signalling, an on-off indication indicating an availability state of a synchronization signal block (SSB) beam; (iii) determining the availability state of the SSB beam; and (iv) determining a starting time as of which the UE is expected to: (a) use the SSB beam if the availability state corresponds to an on-state of the SSB beam, and (b) not use the SSB beam if the availability state corresponds to an off-state of the SSB beam.

According to a tenth aspect, an integrated circuit is provided. The integrated circuit, in operation, controls a process of a scheduling device, the process including the steps of: (i) determining that a user equipment (UE) which is in an inactive state or in an idle state, is to be informed of the availability state of a synchronization signal block (SSB) beam; (ii) determining a starting time that is to be indicated to the UE, wherein the starting time is a time as of which the UE is expected to: (a) use the SSB beam if the availability state corresponds to an on-state of the SSB beam, and (b) not use the SSB beam if the availability state corresponds to an off-state of the SSB beam; (iii) generating a signalling that: indicates the starting time, and includes an on-off indication indicating the availability state of the SSB beam; and (iv) transmitting the signalling.

Summarizing, provided are a communication device, a base station and respective methods for a communication device and a base station. The base station transmits and the communication device receives an on-off indication, when the communication device is in an inactive state or in an idle state. The on-off indication indicates an availability state of a synchronization signal block (SSB) beam. The communication device then determines the availability state of the SSB beam and a starting time as of which the communication device is expected to use the SSB beam if the (indicated) availability state corresponds to an on-state of the SSB beam, and not use the SSB beam if the (indicated) availability state corresponds to an off-state of the SSB beam.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
- a transceiver, which, in operation, when the communication apparatus is in an inactive state or in an idle state, receives a signalling from a scheduling device, the signalling including an availability indication indicating an availability state of a reference signal (RS); and
- circuitry, which, in operation, determines:
  - the availability state of the RS,
  - a first starting time, from which the communication apparatus uses the RS, if the availability state corresponds to an available state of the RS, and
  - a second starting time, from which the communication apparatus does not use the RS, if the availability state corresponds to an unavailable state of the RS, wherein,
- the availability indication comprises a bitmap, and
- a plurality of bits of the bitmap are associated with a plurality of resource sets for the RS, wherein a value of '1' for a bit of the bitmap indicates presence of at least one resource set for the RS, among the plurality of resource sets for the RS, which is associated with the bit.

2. The communication apparatus according to claim 1, wherein
- the circuitry, in operation:
  - obtains, from the signalling, an indication indicating positive paging occasions (POs) among configured POs, wherein the positive POs are POs in which the communication apparatus monitors a paging physical downlink control channel (PDCCH).

3. The UE communication apparatus according to claim 1, wherein
- the circuitry, in operation, determines, in the determining, that:
  - the first starting time corresponds to a first configured time point, when the availability state corresponds to the available state, and
  - the second starting time corresponds to a second configured time point, when the availability state corresponds to the unavailable state.

4. The communication apparatus according to claim 3, wherein
- the first configured time point is a paging cycle among configured paging cycles, or a paging frame (PF) among configured PFs; and/or
- the second configured time point is a paging cycle among configured paging cycles, or a PF among configured PFs.

5. The communication apparatus according to claim 1, wherein the circuitry, in operation:

obtains, from a System Information Block (SIB), an offset usable in determining, the first starting time or the second starting time.

6. The communication apparatus according to claim 5, wherein the offset is an integer, N, times a paging frame (PF).

7. The communication apparatus according to claim 1, wherein the circuitry, in operation, determines, that the communication apparatus uses the RS in accordance with the availability state indicated by the signalling until an end time, wherein the end time is:

configured by a System Information Block (SIB); or default.

8. The communication apparatus according to claim 1, wherein the circuitry, in operation, determines, that the communication apparatus:

uses the RS until indicated otherwise, when the availability state corresponds to the available state; and/or does not use the RS in accordance with the availability state indicated by the signalling until indicated otherwise, when the availability state corresponds to the unavailable state.

9. The communication apparatus according to claim 1, wherein the circuitry, in operation, determines, that the communication apparatus uses or does not use the RS in accordance with the availability state indicated by the signalling until:

an end time configured by a System Information Block (SIB), when the availability state corresponds to the available state; and until indicated otherwise, when the availability state corresponds to the unavailable state.

10. A method for a communication apparatus, the method including the steps of:

receiving, when the communication apparatus is in an inactive state or in an idle state, a signalling from a scheduling device, the signalling including an availability indication indicating an availability state of a reference signal (RS);

determining the availability state of the RS;

determining a first starting time, from which the communication apparatus uses the RS, if the availability state corresponds to an available state of the RS, and determining a second starting time, from which the communication apparatus does not use the RS, if the availability state corresponds to an unavailable state of the RS, wherein the availability indication comprises a bitmap, and a plurality of bits of the bitmap are associated with a plurality of resource sets for the RS, wherein a value of '1' for a bit of the bitmap indicates presence of at least one resource set for the RS, among the plurality of resource sets for the RS, which is associated with the bit.

11. A scheduling device, comprising:

circuitry which, in operation:

determines that a communication apparatus, which is in an inactive state or in an idle state, is to be informed of an availability state of a reference signal (RS);

determines a first starting time, from which the communication apparatus uses the RS if the availability state corresponds to an available state of the RS, and determines a second starting time, from which the communication apparatus does not use the RS if the availability state corresponds to an unavailable state of the RS; and a transceiver which, in operation, transmits a signalling including an availability indication indicating the availability state of the RS, wherein the availability indication comprises a bitmap, and a plurality of bits of the bitmap are associated with a plurality of resource sets for the RS, wherein a value of '1' for a bit of the bitmap indicates presence of at least one resource set for the RS, among the plurality of resource sets for the RS, which is associated with the bit.

12. The communication apparatus according to claim 1, wherein a first bit of the plurality of bits is associated with a first resource set of the plurality of resource sets, and a second bit of the plurality of bits is associated with a second resource set of the plurality of resource sets.

13. The communication apparatus according to claim 1, wherein a first bit of the plurality of bits indicates a first availability state of a first resource set of the plurality of resource sets, and a second bit of the plurality of bits indicates a second availability state of a second resource set of the plurality of resource sets.

14. The communication apparatus according to claim 1, wherein the communication apparatus monitors the signaling per paging cycle.

15. The communication apparatus according to claim 1, wherein a validity duration of the availability indication is configurable for a RS configuration.

16. The communication apparatus according to claim 1, wherein a validity duration of the availability indication is configured by a System Information Block (SIB).

17. The communication apparatus according to claim 1, wherein a first bit of the plurality of bits is associated with a first validity duration of a first resource set of the plurality of resource sets, and a second bit of the plurality of bits is associated with a second validity duration of a second resource set of the plurality of resource sets.

* * * * *